United States Patent
Hazani et al.

(10) Patent No.: US 10,992,484 B2
(45) Date of Patent: Apr. 27, 2021

(54) POWER MANAGEMENT FOR DISTRIBUTED COMMUNICATION SYSTEMS, AND RELATED COMPONENTS, SYSTEMS, AND METHODS

(71) Applicant: Corning Optical Communications LLC, Hickory, NC (US)

(72) Inventors: Ami Hazani, Ra'anana (IL); Guy Lupescu, Tel Aviv (IL); Ofer Nisan, Netanya (IL)

(73) Assignee: Corning Optical Communications LLC, Charlotte, NC (US)

( * ) Notice: Subject to any disclaimer, the term of this patent is extended or adjusted under 35 U.S.C. 154(b) by 1087 days.

(21) Appl. No.: 15/049,621

(22) Filed: Feb. 22, 2016

(65) Prior Publication Data
US 2016/0173291 A1  Jun. 16, 2016

Related U.S. Application Data

(63) Continuation of application No. PCT/IL2014/050766, filed on Aug. 26, 2014.
(Continued)

(51) Int. Cl.
*H04L 12/10* (2006.01)
*H04L 12/40* (2006.01)
(Continued)

(52) U.S. Cl.
CPC .............. *H04L 12/10* (2013.01); *G06F 1/266* (2013.01); *H04L 12/40045* (2013.01); *H04W 52/04* (2013.01)

(58) Field of Classification Search
CPC ... H04L 12/10; H04L 12/40013; G01R 27/16; G01R 27/04; G01R 27/08; H04W 88/085;
(Continued)

(56) References Cited

U.S. PATENT DOCUMENTS 4,449,246 A   5/1984   Seiler et al.
4,665,560 A   5/1987   Lange
(Continued)

FOREIGN PATENT DOCUMENTS

CN   1764123 A      4/2006
CN   101030162 A    9/2007
(Continued)

OTHER PUBLICATIONS

Final Office Action for U.S Appl. No. 14/884,317, dated Jul. 28, 2017, 26 pages.
(Continued)

*Primary Examiner* — Ryan Johnson
(74) *Attorney, Agent, or Firm* — C. Keith Montgomery

(57) ABSTRACT

Power management techniques in distributed communication systems in which the power available at a remote unit (RU) is measured and compared to the power requirements of the RU. Voltage and current are measured for two dummy loads at the RU and these values are used to solve for the output voltage of the power supply and the resistance of the wires. From these values, a maximum power available may be calculated and compared to power requirements of the RU.

20 Claims, 8 Drawing Sheets

Related U.S. Application Data

(60) Provisional application No. 61/870,976, filed on Aug. 28, 2013.

(51) Int. Cl.
*G06F 1/26* (2006.01)
*H04W 52/04* (2009.01)

(58) Field of Classification Search
CPC ......... H04W 52/0206; H04B 10/25753; H04B 10/808
See application file for complete search history.

(56) References Cited

U.S. PATENT DOCUMENTS

| | | | |
|---|---|---|---|
| 4,939,852 A | 7/1990 | Brenner | |
| 4,972,346 A | 11/1990 | Kawano et al. | |
| 5,056,109 A | 10/1991 | Gilhousen et al. | |
| 5,138,679 A | 8/1992 | Edwards et al. | |
| 5,187,803 A | 2/1993 | Sohner et al. | |
| 5,206,655 A | 4/1993 | Caille et al. | |
| 5,208,812 A | 5/1993 | Dudek et al. | |
| 5,278,989 A | 1/1994 | Burke et al. | |
| 5,280,472 A | 1/1994 | Gilhousen et al. | |
| 5,329,604 A | 7/1994 | Baldwin et al. | |
| 5,381,459 A | 1/1995 | Lappington | |
| 5,396,224 A | 3/1995 | Dukes et al. | |
| 5,420,863 A | 5/1995 | Taketsugu et al. | |
| 5,432,838 A | 7/1995 | Purchase et al. | |
| 5,436,827 A | 7/1995 | Gunn et al. | |
| 5,519,830 A | 5/1996 | Opoczynski | |
| 5,534,854 A | 7/1996 | Bradbury et al. | |
| 5,559,831 A | 9/1996 | Keith | |
| 5,598,314 A | 1/1997 | Hall | |
| 5,606,725 A | 2/1997 | Hart | |
| 5,668,562 A | 9/1997 | Cutrer et al. | |
| 5,682,256 A | 10/1997 | Motley et al. | |
| 5,708,681 A | 1/1998 | Malkemes et al. | |
| 5,726,984 A | 3/1998 | Kubler et al. | |
| 5,765,099 A | 6/1998 | Georges et al. | |
| 5,774,316 A | 6/1998 | McGary et al. | |
| 5,790,536 A | 8/1998 | Mahany et al. | |
| 5,802,173 A | 9/1998 | Hamilton-Piercy et al. | |
| 5,809,395 A | 9/1998 | Hamilton-Piercy et al. | |
| 5,809,431 A | 9/1998 | Bustamante et al. | |
| 5,818,883 A | 10/1998 | Smith et al. | |
| 5,839,052 A | 11/1998 | Dean et al. | |
| 5,862,460 A | 1/1999 | Rich | |
| 5,867,763 A | 2/1999 | Dean et al. | |
| 5,889,469 A | 3/1999 | Mykytiuk et al. | |
| 5,953,670 A | 9/1999 | Newson | |
| 5,969,837 A | 10/1999 | Farber et al. | |
| 5,983,070 A | 11/1999 | Georges et al. | |
| 6,006,069 A | 12/1999 | Langston | |
| 6,011,980 A | 1/2000 | Nagano et al. | |
| 6,014,546 A | 1/2000 | Georges et al. | |
| 6,037,898 A | 3/2000 | Parish et al. | |
| 6,060,879 A | 5/2000 | Mussenden | |
| 6,069,721 A | 5/2000 | Oh et al. | |
| 6,118,767 A | 9/2000 | Shen et al. | |
| 6,122,529 A | 9/2000 | Sabat, Jr. et al. | |
| 6,125,048 A | 9/2000 | Loughran et al. | |
| 6,128,477 A | 10/2000 | Freed | |
| 6,157,810 A | 12/2000 | Georges et al. | |
| 6,163,266 A | 12/2000 | Fasullo et al. | |
| 6,188,876 B1 | 2/2001 | Kim | |
| 6,192,216 B1 | 2/2001 | Sabat, Jr. et al. | |
| 6,194,968 B1 | 2/2001 | Winslow | |
| 6,212,274 B1 | 4/2001 | Ninh | |
| 6,212,397 B1 | 4/2001 | Langston et al. | |
| 6,222,503 B1 | 4/2001 | Gietema | |
| 6,223,201 B1 | 4/2001 | Reznak | |
| 6,236,863 B1 | 5/2001 | Waldroup et al. | |
| 6,275,990 B1 | 8/2001 | Dapper et al. | |
| 6,279,158 B1 | 8/2001 | Geile et al. | |
| 6,295,451 B1 | 9/2001 | Mimura | |
| 6,307,869 B1 | 10/2001 | Pawelski | |
| 6,317,599 B1 | 11/2001 | Rappaport et al. | |
| 6,330,241 B1 | 12/2001 | Fort | |
| 6,330,244 B1 | 12/2001 | Swartz et al. | |
| 6,334,219 B1 | 12/2001 | Hill et al. | |
| 6,336,021 B1 | 1/2002 | Nukada | |
| 6,336,042 B1 | 1/2002 | Dawson et al. | |
| 6,340,932 B1 | 1/2002 | Rodgers et al. | |
| 6,353,600 B1 | 3/2002 | Schwartz et al. | |
| 6,366,774 B1 | 4/2002 | Ketonen et al. | |
| 6,370,203 B1 | 4/2002 | Boesch et al. | |
| 6,374,124 B1 | 4/2002 | Slabinski | |
| 6,389,010 B1 | 5/2002 | Kubler et al. | |
| 6,400,318 B1 | 6/2002 | Kasami et al. | |
| 6,400,418 B1 | 6/2002 | Wakabayashi | |
| 6,405,018 B1 | 6/2002 | Reudink et al. | |
| 6,415,132 B1 | 7/2002 | Sabat, Jr. | |
| 6,421,327 B1 | 7/2002 | Lundby | |
| 6,448,558 B1 | 9/2002 | Greene | |
| 6,452,915 B1 | 9/2002 | Jorgensen | |
| 6,480,702 B1 | 11/2002 | Sabat, Jr. | |
| 6,496,290 B1 | 12/2002 | Lee | |
| 6,519,449 B1 | 2/2003 | Zhang et al. | |
| 6,535,330 B1 | 3/2003 | Lelic et al. | |
| 6,535,720 B1 | 3/2003 | Kintis et al. | |
| 6,551,065 B2 | 4/2003 | Lee | |
| 6,580,402 B2 | 6/2003 | Navarro et al. | |
| 6,580,905 B1 | 6/2003 | Naidu et al. | |
| 6,584,197 B1 | 6/2003 | Boudreaux, Jr. et al. | |
| 6,587,514 B1 | 7/2003 | Wright et al. | |
| 6,588,943 B1 | 7/2003 | Howard | |
| 6,598,009 B2 | 7/2003 | Yang | |
| 6,615,074 B2 | 9/2003 | Mickle et al. | |
| 6,628,732 B1 | 9/2003 | Takaki | |
| 6,657,535 B1 | 12/2003 | Magbie et al. | |
| 6,658,269 B1 | 12/2003 | Golemon et al. | |
| 6,665,308 B1 | 12/2003 | Rakib et al. | |
| 6,670,930 B2 | 12/2003 | Navarro | |
| 6,678,509 B2 | 1/2004 | Skarman et al. | |
| 6,704,298 B1 | 3/2004 | Matsumiya et al. | |
| 6,745,013 B1 | 6/2004 | Porter et al. | |
| 6,763,226 B1 | 7/2004 | McZeal, Jr. | |
| 6,785,558 B1 | 8/2004 | Stratford et al. | |
| 6,801,767 B1 | 10/2004 | Schwartz et al. | |
| 6,823,174 B1 | 11/2004 | Masenten et al. | |
| 6,826,163 B2 | 11/2004 | Mani et al. | |
| 6,836,660 B1 | 12/2004 | Wala | |
| 6,836,673 B1 | 12/2004 | Troll | |
| 6,842,433 B2 | 1/2005 | West et al. | |
| 6,850,510 B2 | 2/2005 | Kubler | |
| 6,876,056 B2 | 4/2005 | Tilmans et al. | |
| 6,882,311 B2 | 4/2005 | Walker et al. | |
| 6,885,344 B2 | 4/2005 | Mohamadi | |
| 6,919,858 B2 | 7/2005 | Rofougaran | |
| 6,931,659 B1 | 8/2005 | Kinemura | |
| 6,934,511 B1 | 8/2005 | Lovinggood et al. | |
| 6,934,541 B2 | 8/2005 | Miyatani | |
| 6,937,878 B2 | 8/2005 | Kim et al. | |
| 6,941,112 B2 | 9/2005 | Hasegawa | |
| 6,961,312 B2 | 11/2005 | Kubler et al. | |
| 6,977,502 B1 | 12/2005 | Hertz | |
| 6,984,073 B2 | 1/2006 | Cox | |
| 7,015,826 B1 | 3/2006 | Chan et al. | |
| 7,020,488 B1 | 3/2006 | Bleile et al. | |
| 7,024,166 B2 | 4/2006 | Wallace | |
| 7,039,399 B2 | 5/2006 | Fischer | |
| 7,043,271 B1 | 5/2006 | Seto et al. | |
| 7,050,017 B2 | 5/2006 | King et al. | |
| 7,053,838 B2 | 5/2006 | Judd | |
| 7,069,577 B2 | 6/2006 | Geile et al. | |
| 7,072,586 B2 | 7/2006 | Aburakawa et al. | |
| 7,073,953 B2 | 7/2006 | Roth et al. | |
| 7,103,119 B2 | 9/2006 | Matsuoka et al. | |
| 7,103,377 B2 | 9/2006 | Bauman et al. | |
| 7,110,795 B2 | 9/2006 | Doi | |
| 7,142,125 B2 | 11/2006 | Larson et al. | |
| 7,142,535 B2 | 11/2006 | Kubler et al. | |
| 7,142,619 B2 | 11/2006 | Sommer et al. | |

(56) References Cited

U.S. PATENT DOCUMENTS

| | | | |
|---|---|---|---|
| 7,144,255 B2 | 12/2006 | Seymour |
| 7,171,244 B2 | 1/2007 | Bauman |
| 7,177,728 B2 | 2/2007 | Gardner |
| 7,184,728 B2 | 2/2007 | Solum |
| 7,190,748 B2 | 3/2007 | Kim et al. |
| 7,194,023 B2 | 3/2007 | Morrell et al. |
| 7,199,443 B2 | 4/2007 | Elsharawy |
| 7,269,311 B2 | 9/2007 | Kim et al. |
| 7,315,735 B2 | 1/2008 | Graham |
| 7,359,647 B1 | 4/2008 | Faria et al. |
| 7,359,674 B2 | 4/2008 | Markki et al. |
| 7,366,151 B2 | 4/2008 | Kubler et al. |
| 7,369,526 B2 | 5/2008 | Lechleider et al. |
| 7,388,892 B2 | 6/2008 | Nishiyama et al. |
| 7,392,025 B2 | 6/2008 | Rooyen et al. |
| 7,412,224 B2 | 8/2008 | Kotola et al. |
| 7,417,443 B2 * | 8/2008 | Admon ............... H04L 12/10 |
| | | 324/522 |
| 7,450,853 B2 | 11/2008 | Kim et al. |
| 7,451,365 B2 | 11/2008 | Wang et al. |
| 7,454,171 B2 | 11/2008 | Palin et al. |
| 7,460,507 B2 | 12/2008 | Kubler et al. |
| 7,469,105 B2 | 12/2008 | Wake et al. |
| 7,483,711 B2 | 1/2009 | Burchfiel |
| 7,486,782 B1 | 2/2009 | Roos |
| 7,505,747 B2 | 3/2009 | Solum |
| 7,512,419 B2 | 3/2009 | Solum |
| 7,515,526 B2 | 4/2009 | Elkayam et al. |
| 7,526,303 B2 | 4/2009 | Chary |
| 7,539,509 B2 | 5/2009 | Bauman et al. |
| 7,542,452 B2 | 6/2009 | Penumetsa |
| 7,545,055 B2 | 6/2009 | Barrass |
| 7,546,138 B2 | 6/2009 | Bauman |
| 7,548,138 B2 | 6/2009 | Kamgaing |
| 7,551,641 B2 | 6/2009 | Pirzada et al. |
| 7,557,758 B2 | 7/2009 | Rofougaran |
| 7,567,579 B2 | 7/2009 | Korcharz et al. |
| 7,580,384 B2 | 8/2009 | Kubler et al. |
| 7,585,119 B2 | 9/2009 | Sasaki |
| 7,586,861 B2 | 9/2009 | Kubler et al. |
| 7,587,559 B2 | 9/2009 | Brittain et al. |
| 7,599,420 B2 | 10/2009 | Forenza et al. |
| 7,610,046 B2 | 10/2009 | Wala |
| 7,619,535 B2 | 11/2009 | Chen et al. |
| 7,627,250 B2 | 12/2009 | George et al. |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,650,519 B1 | 1/2010 | Hobbs et al. |
| 7,653,397 B2 | 1/2010 | Pemu et al. |
| 7,668,565 B2 | 2/2010 | Ylänen et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,715,375 B2 | 5/2010 | Kubler et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,809,012 B2 | 10/2010 | Ruuska et al. |
| 7,812,766 B2 | 10/2010 | Leblanc et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,848,770 B2 | 12/2010 | Scheinert |
| 7,852,228 B2 | 12/2010 | Teng et al. |
| 7,853,234 B2 | 12/2010 | Afsahi |
| 7,870,321 B2 | 1/2011 | Rofougaran |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,899,395 B2 | 3/2011 | Martch et al. |
| 7,904,115 B2 | 3/2011 | Hageman et al. |
| 7,907,972 B2 | 3/2011 | Walton et al. |
| 7,912,043 B2 | 3/2011 | Kubler et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,970,428 B2 | 6/2011 | Lin et al. |
| 7,990,925 B2 | 8/2011 | Tinnakornsrisuphap et al. |
| 7,996,020 B1 | 8/2011 | Chhabra |
| 8,001,397 B2 | 8/2011 | Hansalia |
| 8,018,907 B2 | 9/2011 | Kubler et al. |
| 8,036,157 B2 | 10/2011 | Hanabusa et al. |
| 8,036,308 B2 | 10/2011 | Rofougaran |
| 8,068,937 B2 | 11/2011 | Eaves |
| 8,078,894 B1 | 12/2011 | Ogami |
| 8,082,353 B2 | 12/2011 | Huber et al. |
| 8,086,192 B2 | 12/2011 | Rofougaran et al. |
| 8,155,525 B2 | 4/2012 | Cox |
| 8,270,838 B2 | 9/2012 | Cox |
| 8,270,990 B2 | 9/2012 | Zhao |
| 8,306,563 B2 | 11/2012 | Zavadsky et al. |
| 8,328,145 B2 | 12/2012 | Smith |
| 8,406,941 B2 | 3/2013 | Smith |
| 8,417,979 B2 | 4/2013 | Maroney |
| 8,457,562 B2 | 6/2013 | Zavadsky et al. |
| 8,514,092 B2 | 8/2013 | Cao et al. |
| 8,532,492 B2 | 9/2013 | Palanisamy et al. |
| 8,548,330 B2 | 10/2013 | Berlin et al. |
| 8,588,614 B2 | 11/2013 | Larsen |
| 8,620,375 B2 | 12/2013 | Kim et al. |
| 8,622,632 B2 | 1/2014 | Isenhour et al. |
| 8,649,684 B2 | 2/2014 | Casterline et al. |
| 8,744,390 B2 | 6/2014 | Stratford |
| 8,781,637 B2 | 7/2014 | Eaves |
| 8,830,035 B2 | 9/2014 | Lindley et al. |
| 8,831,428 B2 | 9/2014 | Kobyakov et al. |
| 8,831,593 B2 | 9/2014 | Melester et al. |
| 8,855,832 B2 | 10/2014 | Rees |
| 8,930,736 B2 | 1/2015 | James |
| 8,971,903 B2 | 3/2015 | Hossain et al. |
| 8,994,276 B2 | 3/2015 | Recker et al. |
| 9,026,036 B2 | 5/2015 | Saban et al. |
| 9,160,449 B2 | 10/2015 | Heidler et al. |
| 9,166,690 B2 | 10/2015 | Brower et al. |
| 9,184,795 B2 | 11/2015 | Eaves |
| 9,223,336 B2 | 12/2015 | Petersen et al. |
| 9,252,874 B2 | 2/2016 | Heidler et al. |
| 9,343,797 B2 | 5/2016 | Shoemaker et al. |
| 9,419,436 B2 | 8/2016 | Eaves et al. |
| 9,699,723 B2 | 7/2017 | Heidler et al. |
| 9,853,689 B2 | 12/2017 | Eaves |
| 2001/0036199 A1 | 11/2001 | Terry |
| 2002/0051434 A1 | 5/2002 | Ozluturk et al. |
| 2002/0097031 A1 | 7/2002 | Cook et al. |
| 2002/0123365 A1 | 9/2002 | Thorson et al. |
| 2002/0180554 A1 | 12/2002 | Clark et al. |
| 2003/0111909 A1 | 6/2003 | Liu et al. |
| 2003/0146765 A1 | 8/2003 | Darshan et al. |
| 2003/0147353 A1 | 8/2003 | Clarkson et al. |
| 2003/0178979 A1 | 9/2003 | Cohen |
| 2004/0095907 A1 | 5/2004 | Agee et al. |
| 2004/0146020 A1 | 7/2004 | Kubler et al. |
| 2004/0151164 A1 | 8/2004 | Kubler et al. |
| 2004/0160912 A1 | 8/2004 | Kubler et al. |
| 2004/0160913 A1 | 8/2004 | Kubler et al. |
| 2004/0165573 A1 | 8/2004 | Kubler et al. |
| 2004/0203704 A1 | 10/2004 | Ommodt et al. |
| 2004/0230846 A1 | 11/2004 | Mancey et al. |
| 2005/0047030 A1 | 3/2005 | Lee |
| 2005/0147071 A1 | 7/2005 | Karaoguz et al. |

(56) References Cited

U.S. PATENT DOCUMENTS

| | | |
|---|---|---|
| 2005/0197094 A1 | 9/2005 | Darshan et al. |
| 2005/0226625 A1 | 10/2005 | Wake et al. |
| 2005/0262364 A1 | 11/2005 | Diab et al. |
| 2005/0272439 A1 | 12/2005 | Picciriello et al. |
| 2006/0053324 A1 | 3/2006 | Giat et al. |
| 2006/0084379 A1 | 4/2006 | O'Neill |
| 2006/0192434 A1 | 8/2006 | Vrla et al. |
| 2006/0274704 A1 | 12/2006 | Desai et al. |
| 2007/0004467 A1 | 1/2007 | Chary |
| 2007/0058332 A1 | 3/2007 | Canterbury et al. |
| 2007/0060045 A1 | 3/2007 | Prautzsch |
| 2007/0060055 A1 | 3/2007 | Desai et al. |
| 2007/0076649 A1 | 4/2007 | Lin et al. |
| 2007/0166050 A1 | 7/2007 | Horio et al. |
| 2007/0224954 A1 | 9/2007 | Gopi |
| 2007/0286599 A1 | 12/2007 | Sauer et al. |
| 2007/0291732 A1 | 12/2007 | Todd et al. |
| 2007/0297005 A1 | 12/2007 | Montierth et al. |
| 2008/0002614 A1 | 1/2008 | Hanabusa et al. |
| 2008/0043714 A1 | 2/2008 | Pernu |
| 2008/0044186 A1 | 2/2008 | George et al. |
| 2008/0045271 A1 | 2/2008 | Azuma |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0129634 A1 | 6/2008 | Pera et al. |
| 2008/0134194 A1 | 6/2008 | Liu |
| 2008/0164890 A1 | 7/2008 | Admon et al. |
| 2008/0166094 A1 | 7/2008 | Bookbinder et al. |
| 2008/0167931 A1 | 7/2008 | Gerstemeier et al. |
| 2008/0186143 A1 | 8/2008 | George et al. |
| 2008/0207253 A1 | 8/2008 | Jaakkola et al. |
| 2008/0251071 A1 | 10/2008 | Armitstead et al. |
| 2008/0252307 A1 | 10/2008 | Schindler |
| 2008/0253351 A1 | 10/2008 | Pernu et al. |
| 2008/0261656 A1 | 10/2008 | Bella et al. |
| 2008/0268833 A1 | 10/2008 | Huang et al. |
| 2008/0272725 A1 | 11/2008 | Bojrup et al. |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2009/0007192 A1 | 1/2009 | Singh |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0040027 A1 | 2/2009 | Nakao |
| 2009/0055672 A1 | 2/2009 | Burkland et al. |
| 2009/0059903 A1 | 3/2009 | Kubler et al. |
| 2009/0061796 A1 | 3/2009 | Arkko et al. |
| 2009/0073916 A1 | 3/2009 | Zhang et al. |
| 2009/0100275 A1 | 4/2009 | Chang et al. |
| 2009/0121548 A1 | 5/2009 | Schindler et al. |
| 2009/0149221 A1 | 6/2009 | Liu et al. |
| 2009/0169163 A1 | 7/2009 | Abbott et al. |
| 2009/0175214 A1 | 7/2009 | Sfar et al. |
| 2009/0218407 A1 | 9/2009 | Rofougaran |
| 2009/0218657 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252205 A1 | 10/2009 | Rheinfelder et al. |
| 2009/0258652 A1 | 10/2009 | Lambert et al. |
| 2009/0280854 A1 | 11/2009 | Khan et al. |
| 2009/0285147 A1 | 11/2009 | Subasic et al. |
| 2009/0304387 A1 | 12/2009 | Farries et al. |
| 2010/0002626 A1 | 1/2010 | Schmidt et al. |
| 2010/0027443 A1 | 2/2010 | LoGalbo et al. |
| 2010/0054746 A1 | 3/2010 | Logan |
| 2010/0056184 A1 | 3/2010 | Vakil et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0106985 A1 | 4/2010 | Panguluri et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0148373 A1 | 6/2010 | Chandrasekaran |
| 2010/0156721 A1 | 6/2010 | Alamouti et al. |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0240302 A1 | 9/2010 | Buczkiewicz et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0290355 A1 | 11/2010 | Roy et al. |
| 2010/0290787 A1 | 11/2010 | Cox |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0322206 A1 | 12/2010 | Hole et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0021146 A1 | 1/2011 | Pernu |
| 2011/0021224 A1 | 1/2011 | Koskinen et al. |
| 2011/0055861 A1 | 3/2011 | Covell et al. |
| 2011/0065450 A1 | 3/2011 | Kazmi |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0105110 A1 | 5/2011 | Carmon et al. |
| 2011/0116572 A1 | 5/2011 | Lee et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0172841 A1 | 7/2011 | Forbes, Jr. |
| 2011/0182230 A1 | 7/2011 | Ohm et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0241425 A1 | 10/2011 | Hunter, Jr. et al. |
| 2011/0244887 A1 | 10/2011 | Dupray et al. |
| 2011/0249715 A1 | 10/2011 | Choi et al. |
| 2011/0256878 A1 | 10/2011 | Zhu et al. |
| 2011/0260939 A1 | 10/2011 | Korva et al. |
| 2011/0266999 A1 | 11/2011 | Yodfat et al. |
| 2011/0268033 A1 | 11/2011 | Boldi et al. |
| 2011/0268446 A1 | 11/2011 | Cune et al. |
| 2011/0268449 A1 | 11/2011 | Berlin et al. |
| 2011/0268452 A1 | 11/2011 | Beaman et al. |
| 2011/0274021 A1 | 11/2011 | He et al. |
| 2011/0281536 A1 | 11/2011 | Lee et al. |
| 2012/0009926 A1 | 1/2012 | Hevizi et al. |
| 2012/0033676 A1 | 2/2012 | Mundra et al. |
| 2012/0063377 A1 | 3/2012 | Osterling et al. |
| 2012/0099448 A1 | 4/2012 | Matsuo et al. |
| 2012/0106442 A1 | 5/2012 | Xiao |
| 2012/0120995 A1 | 5/2012 | Wurth |
| 2012/0122405 A1 | 5/2012 | Gerber et al. |
| 2012/0163829 A1 | 6/2012 | Cox |
| 2012/0196611 A1 | 8/2012 | Venkatraman et al. |
| 2012/0214538 A1 | 8/2012 | Kim et al. |
| 2012/0289224 A1 | 11/2012 | Hallberg et al. |
| 2012/0293390 A1 | 11/2012 | Shoemaker et al. |
| 2012/0307876 A1 | 12/2012 | Trachewsky et al. |
| 2012/0317426 A1 | 12/2012 | Hunter, Jr. et al. |
| 2012/0319916 A1 | 12/2012 | Gears et al. |

(56) References Cited

U.S. PATENT DOCUMENTS

| | | |
|---|---|---|
| 2013/0017863 A1 | 1/2013 | Kummetz et al. |
| 2013/0035047 A1 | 2/2013 | Chen et al. |
| 2013/0040676 A1 | 2/2013 | Kang et al. |
| 2013/0046415 A1 | 2/2013 | Curtis |
| 2013/0049469 A1 | 2/2013 | Huff et al. |
| 2013/0094425 A1 | 4/2013 | Soriaga et al. |
| 2013/0102309 A1 | 4/2013 | Chande et al. |
| 2013/0128929 A1 | 5/2013 | Clevorn et al. |
| 2013/0132683 A1 | 5/2013 | Ajanovic et al. |
| 2013/0137411 A1 | 5/2013 | Mahn |
| 2013/0188959 A1 | 7/2013 | Cune et al. |
| 2013/0225182 A1 | 8/2013 | Singh et al. |
| 2013/0225183 A1 | 8/2013 | Meshkati et al. |
| 2013/0235726 A1 | 9/2013 | Frederiksen et al. |
| 2013/0249292 A1 | 9/2013 | Blackwell, Jr. et al. |
| 2013/0260706 A1 | 10/2013 | Singh |
| 2013/0295980 A1 | 11/2013 | Reuven et al. |
| 2013/0330086 A1 | 12/2013 | Berlin et al. |
| 2013/0337750 A1 | 12/2013 | Ko |
| 2014/0024402 A1 | 1/2014 | Singh |
| 2014/0037294 A1 | 2/2014 | Cox et al. |
| 2014/0050482 A1 | 2/2014 | Berlin et al. |
| 2014/0075217 A1 | 3/2014 | Wong et al. |
| 2014/0087742 A1 | 3/2014 | Brower et al. |
| 2014/0089688 A1 | 3/2014 | Man et al. |
| 2014/0089697 A1 | 3/2014 | Kim et al. |
| 2014/0097846 A1 | 4/2014 | Lemaire et al. |
| 2014/0146692 A1 | 5/2014 | Hazani et al. |
| 2014/0148214 A1 | 5/2014 | Sasson |
| 2014/0153919 A1 | 6/2014 | Casterline et al. |
| 2014/0158781 A1 | 6/2014 | Kates |
| 2014/0169246 A1 | 6/2014 | Chui et al. |
| 2014/0233442 A1 | 8/2014 | Atlas et al. |
| 2014/0293894 A1 | 10/2014 | Saban et al. |
| 2014/0308043 A1 | 10/2014 | Heidler et al. |
| 2014/0308044 A1 | 10/2014 | Heidler et al. |
| 2015/0072632 A1 | 3/2015 | Pourkhaatoun et al. |
| 2015/0082066 A1 | 3/2015 | Bose et al. |
| 2015/0098350 A1 | 4/2015 | Mini et al. |
| 2015/0126251 A1 | 5/2015 | Hunter, Jr. et al. |
| 2015/0207318 A1 | 7/2015 | Lowe et al. |
| 2015/0215001 A1 | 7/2015 | Eaves |
| 2015/0249513 A1 | 9/2015 | Schwab et al. |
| 2015/0380928 A1 | 12/2015 | Saig et al. |
| 2016/0294568 A1 | 10/2016 | Chawgo et al. |
| 2017/0055207 A1 | 2/2017 | Hagage et al. |
| 2017/0214236 A1 | 7/2017 | Eaves |
| 2017/0229886 A1 | 8/2017 | Eaves |
| 2018/0314311 A1 | 11/2018 | Tanaka et al. |

FOREIGN PATENT DOCUMENTS

| | | |
|---|---|---|
| CN | 101232179 A | 7/2008 |
| CN | 101803246 A | 8/2010 |
| CN | 101876962 A | 11/2010 |
| CN | 101299517 B | 12/2011 |
| EP | 0851618 A2 | 7/1998 |
| EP | 0924881 A2 | 6/1999 |
| EP | 1227605 A2 | 7/2002 |
| EP | 1347584 A2 | 9/2003 |
| EP | 1347607 A1 | 9/2003 |
| EP | 1954019 A1 | 8/2008 |
| GB | 2275834 A | 9/1994 |
| JP | 58055770 A | 4/1983 |
| JP | 2002353813 A | 12/2002 |
| KR | 20040053467 A | 6/2004 |
| KR | 101031619B B1 | 4/2011 |
| WO | 9603823 A1 | 2/1996 |
| WO | 0072475 A1 | 11/2000 |
| WO | 0184760 A1 | 11/2001 |
| WO | 03024027 A1 | 3/2003 |
| WO | 2005117337 A1 | 12/2005 |
| WO | 2006077569 A1 | 7/2006 |
| WO | 2006077570 A1 | 7/2006 |
| WO | 2008083317 A1 | 7/2008 |
| WO | 2009014710 A1 | 1/2009 |
| WO | 2009145789 A1 | 12/2009 |
| WO | 2010090999 A1 | 8/2010 |
| WO | 2010132292 A1 | 11/2010 |
| WO | 2011123314 A1 | 10/2011 |
| WO | 2012051227 A1 | 4/2012 |
| WO | 2012051230 A1 | 4/2012 |
| WO | 2012064333 A1 | 5/2012 |
| WO | 2012071367 A1 | 5/2012 |
| WO | 2012103822 A2 | 8/2012 |
| WO | 2012115843 A1 | 8/2012 |
| WO | 2015049671 A2 | 4/2015 |

OTHER PUBLICATIONS

Advisory Action for U.S. Appl. No. 14/884,317, dated Oct. 10, 2017, 6 pages.

Final Office Action for U.S. Appl. No. 15/156,556, dated Jul. 26, 2017, 16 pages.

Advisory Action for U.S. Appl. No. 15/156,556, dated Oct. 4, 2017, 3 pages.

Non-Final Office Action for U.S. Appl. No. 15/228,375, dated Sep. 21, 2017, 10 pages.

Notice of Allowance for U.S. Appl. No. 15/585,688, dated Sep. 1, 2017, 8 pages.

Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.

Author Unknown, "INT6400/INT1400: HomePlug AV Chip Set," Product Brief, Atheros Powerline Technology, 27003885 Revision 2, Atheros Communications, Inc., 2009, 2 pages.

Author Unknown, "MegaPlug AV: 200 Mbps Ethernet Adapter," Product Specifications, Actiontec Electronics, Inc., 2010, 2 pages.

Cho, Bong Youl et al. "The Forward Link Performance of a PCS System with an AGC," 4th CDMA International conference and Exhibition, "The Realization of IMT-2000," 1999, 10 pages.

Chu, Ta-Shing et al. "Fiber optic microcellular radio", IEEE Transactions on Vehicular Technology, Aug. 1991, pp. 599-606, vol. 40, Issue 3.

Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.

Dolmans, G. et al. "Performance study of an adaptive dual antenna handset for indoor communications", IEE Proceedings: Microwaves, Antennas and Propagation, Apr. 1999, pp. 138-144, vol. 146, Issue 2.

Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.

Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.

Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.

Windyka, John et al., "System-Level Integrated Circuit (SLIC) Technology Development for Phased Array Antenna Applications," Contractor Report 204132, National Aeronautics and Space Administration, Jul. 1997, 94 pages.

International Preliminary Report on Patentability for PCT/US2011/061761 dated May 28, 2013, 8 pages.

International Search Report for PCT/US2011/061761 dated Jan. 26, 2012, 3 pages.

International Preliminary Report on Patentability; PCT/IL2013/050976; dated June 2, 2015.

Author Unknown, "Equivalent Circuits—(Thevenin and Norton)," Bucknell Lecture Notes, Wayback Machine, Mar. 25, 2010, http://www.facstaff.bucknell.edu/mastascu/elessonsHTML/Source/Source2.html, 15 pages.

(56) References Cited

OTHER PUBLICATIONS

International Preliminary Report on Patentability for PCT/IL2014/050766, dated Mar. 10, 2016, 9 pages.
Advisory Action and Applicant-Initiated Interview Summary for U.S. Appl. 13/687,457, dated May 13, 2016, 5 pages.
Non-final Office Action for U.S. Appl. No. 13/687,457, dated Jun. 27, 2016, 30 pages.
Non-final Office Action for U.S. Appl. No. 13/899,118, dated Jun. 30, 2016, 11 pages.
Final Office Action for U.S. Appl. No. 14/317,475, dated May 26, 2016, 12 pages.
Notice of Allowance for U.S. Appl. No. 14/317,475, dated Aug. 5, 2016, 7 pages.
Notice of Allowance for U.S. Appl. 14/845,768, dated Apr. 11, 2016, 8 pages.
Notice of Allowance for U.S. Appl. No. 14/845,946, dated Jun. 8, 2016, 7 pages.
International Search Report and Written Opinion for PCT/IL2014/051012, dated Mar. 5, 2015, 11 pages.
The Third Office Action for Chinese Patent Application No. 201180059270.4, dated Aug. 23, 2016, 6 pages.
Non-Final Office Action for U.S. Appl. No. 14/845,929, dated Nov. 7, 2016, 5 pages.
Non-Final Office Action for U.S. Appl. No. 14/845,946, dated Sep. 9, 2016, 10 pages.
Non-Final Office Action for U.S. Appl. No. 14/884,317, dated Aug. 31, 2016, 16 pages.
Non-Final Office Action for U.S. Appl. No. 14/853,118, dated Aug. 12, 2016, 7 pages.
Non-Final Office Action for U.S. Appl. No. 14/961,098, dated Nov. 14, 2016, 10 pages.
International Search Report and Written Opinion for International Patent Application No. PCT/IL2016/050306, dated Jun. 8, 2016, 14 pages.
Translation of the Fourth Office Action for Chinese Patent Application No. 201180059270.4, dated Jan. 20, 2017, 6 pages.
Final Office Action for U.S. Appl. No. 13/687,457, dated Feb. 10, 2017, 33 pages.
Notice of Allowance for U.S. Appl. No. 13/899,118, dated Jan. 12, 2017, 7 pages.
Non-Final Office Action for U.S. Appl. No. 14/884,317, dated Feb. 13, 2017, 17 pages.
Author Unknown, "Fiber Optic Distributed Antenna System," Installation and Users Guide, ERAU Version 1.5, May 2002, Andrews Corporation, 53 pages.
Advisory Action for U.S. Appl. No. 13/687,457, dated May 24, 2017, 7 pages.
Notice of Allowance for U.S. Appl. No. 14/845,929, dated May 9, 2017, 7 pages.
Notice of Allowance and Examiner-Initiated Interview Summary for U.S. Appl. No. 14/845,946, dated Apr. 20, 2017, 10 pages.
Non-Final Office Action for U.S. Appl. No. 15/156,556, dated Apr. 11, 2017, 13 pages.
International Search Report for PCT/US2010/056458 dated Aug. 2, 2011, 4 pages.
International Preliminary Report on Patentability for PCT/US2010/056458 dated May 23, 2013, 9 pages.
Non-final Office Action for U.S. Appl. No. 13/410,916 dated Jul. 18, 2012, 13 pages.
Notice of Allowance for U.S. Appl. No. 13/410,916 dated Aug. 9, 2012, 9 pages.
Author Unknown, "MDS SDx Packaged Stations," Technical Manual, MDS 05-6312A01, Revision B, May 2011, GE MDS, LLC, Rochester, New York, 44 pages.
Author Unknown, "Quad Integrated IEEE 802.3at PSE Controller and Power Management System with up to 30W per Port Capabilities," Product Brief, BCM59103, Broadcom Corporation, Oct. 12, 2009, 2 pages.
Author Unknown, "Quad IEEE 802.3at Power Over Ethernet Controller," Product Brief, LTC4266, Linear Technology Corporation, 2009, 2 pages.
Author Unknown, "Single IEEE 802.3at Power Over Ethernet Controller," Product Brief, LTC4274, Linear Technology Corporation, 2009, 2 pages.
Author Unknown, "TPS23841: High-Power, Wide Voltage Range, Quad-Port Ethernet Power Sourcing Equipment Manager," Texas Instruments Incorporated, Nov. 2006, Revised May 2007, 48 pages.
International Search Report for PCT/US2010/034005 dated Aug. 12, 2010, 4 pages.
International Preliminary Report on Patentability for PCT/US2010/034005 dated Nov. 24, 2011, 7 pages.
International Search Report for PCT/US2011/055858 dated Feb. 7, 2012, 4 pages.
International Preliminary Report on Patentability for PCT/US2011/055858 dated Apr. 25, 2013, 8 pages.
International Search Report for PCT/US2011/055861 dated Feb. 7, 2012, 4 pages.
International Preliminary Report on Patentability for PCT/US2011/055861 dated Apr. 25, 2013, 9 pages.
International Preliminary Report on Patentability for PCT/US2011/061761 dated Jun. 6, 2013, 9 pages.
Translation of the the First Office Action for Chinese Patent Application No. 201180059270.4 dated May pp. 13, 2015, 19 pages.
International Search Report for PCT/US2013/058937 dated Jan. 14, 2014, 4 pages.
International Preliminary Report on Patentability for PCT/US2013/058937 dated Apr. 9, 2015, 7 pages.
Non-final Office Action for U.S. Appl. No. 13/626,371 dated Dec. 13, 2013, 15 pages.
Non-final Office Action for U.S. Appl. No. 13/626,371 dated Jun. 25, 2014, 16 pages.
Notice of Allowance for U.S. Appl. No. 13/626,371 dated Nov. 25, 2014, 7 pages.
Notice of Allowance for U.S. Appl. No. 13/626,371 dated Aug. 3, 2015, 7 pages.
Non-final Office Action for U.S. Appl. No. 13/859,985 dated Feb. 27, 2015, 15 pages.
Final Office Action for U.S. Appl. No. 13/859,985 dated Jul. 22, 2015, 8 pages.
Non-final Office Action for U.S. Appl. No. 13/860,017 dated Feb. 27, 2015, 15 pages.
Final Office Action for U.S. Appl. No. 13/860,017 dated Jul. 23, 2015, 8 pages.
Non-Final Office Action for U.S. Appl. No. 13/950,397, dated Mar. 17, 2015, 6 pages.
Notice of Allowance for U.S. Appl. No. 13/950,397, dated Jun. 10, 2015, 7 pages.
Non-Final Office Action for U.S. Appl. No. 13/771,756 dated Sep. 10, 2014, 26 pages.
Final Office Action for U.S. Appl. No. 13/771,756 dated Apr. 30, 2015, 38 pages.
International Search Report for PCT/IL2013/050976, dated Mar. 18, 2014, 3 pages.
Translation of the First Office Action for Chinese Patent Application No. 201180053270.3 dated May 26, 2015, 17 pages.
Translation of the First Office Action for Chinese Patent Application No. 201180052537.7 dated Jun. 25, 2015, 9 pages.
Non-final Office Action for U.S. Appl. No. 13/687,457 dated Jul. 30, 2015, 12 pages.
Advisory Action for U.S. Appl. No. 13/771,756, dated Aug. 21, 2015, 4 pages.
Non-final Office Action for U.S. Appl. No. 13/899,118, dated Jan. 6, 2016, 10 pages.
Non-final Office Action for U.S. Appl. No. 14/845,768, dated Nov. 19, 2015, 12 pages.
Non-final Office Action for U.S. Appl. No. 14/845,946, dated Dec. 17, 2015, 11 pages.
The Second Office Action for Chinese Patent Application No. 201180059270.4, dated Jan. 28, 2016, 42 pages.
Final Office Action for U.S. Appl. No. 13/687,457, dated Feb. 12, 2016, 22 pages.

(56) References Cited

OTHER PUBLICATIONS

Notice of Allowance for U.S. Appl. No. 13/771,756, dated Jan. 29, 2016, 14 pages.
International Search Report and Written Opinion for PCT/IL2015/050656, dated Oct. 8, 2015, 9 pages.
Non-final Office Action for U.S. Appl. No. 14/317,475, dated Feb. 3, 2016, 12 pages.
Patent Cooperation Treaty, International Search Report for PCT/IL2014/050766, dated Nov. 11, 2014, 5 pages.
Final Office Action for U.S. Appl. No. 15/156,556, dated Sep. 26, 2018, 19 pages.
Notice of Allowance for U.S. Appl. No. 15/613,913, dated Aug. 1, 2018, 8 pages.
Notice of Allowance for U.S. Appl. No. 15/228,375, dated Apr. 10, 2018, 8 pages.
Non-Final Office Action for U.S. Appl. No. 15/613,913, dated Feb. 8, 2018, 21 pages.
Non-Final Office Action for U.S. Appl. No. 13/687,457, dated Jul. 10, 2018, 39 pages.
Non-Final Office Action for U.S. Appl. No. 15/156,556, dated May 3, 2018, 12 pages.
Notice of Allowance for U.S. Appl. No. 13/687,457, dated Nov. 20, 2018, 10 pages.
Non-Final Office Action for U.S. Appl. No. 16/031,173, dated Nov. 29, 2018, 14 pages.
Non-Final Office Action for U.S. Appl. No. 16/281,333, dated Aug. 7, 2019, 9 pages.
Notice of Allowance for U.S. Appl. No. 15/614,124, dated Jun. 10, 2019, 7 pages.
Notice of Allowance for U.S. Appl. No. 16/031,173, dated May 9, 2019, 8 pages.
Non-Final Office Action for U.S. Appl. No. 16/225,992, dated Apr. 16, 2019, 16 pages.
Notice of Allowance for U.S. Appl. No. 16/148,420, dated May 7, 2019, 8 pages.

\* cited by examiner

POWER MANAGEMENT FOR DISTRIBUTED COMMUNICATION SYSTEMS, AND RELATED COMPONENTS, SYSTEMS, AND METHODS

RELATED APPLICATION

This application is a continuation of International Application No. PCT/IL14/050766 filed on Aug. 26, 2014 which claims the benefit of priority to U.S. Provisional Application No. 61/870,976, filed on Aug. 28, 2013, both applications being incorporated herein by reference.

The present application is related to U.S. patent application Ser. No. 13/687,457, filed Nov. 28, 2012, entitled "Power Management For Distributed Communication Systems, and Related Components, Systems, and Methods," published as U.S. Pub. No. 20140146692 A1, which is incorporated herein by reference in its entirety.

BACKGROUND

The technology of the disclosure relates to managing power in remote units in a distributed communication system.

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Distributed communications or distributed antenna systems communicate with wireless devices called "clients," which must reside within the wireless range or "cell coverage area" to communicate with an access point device.

One approach to deploying a distributed antenna system involves the use of radio frequency (RF) antenna coverage areas, also referred to as "antenna coverage areas." Antenna coverage areas can have a radius in the range from a few meters up to twenty meters as an example. Combining a number of access point devices creates an array of antenna coverage areas. Because the antenna coverage areas each cover small areas, there are typically only a few users (clients) per antenna coverage area. This allows for minimizing the amount of RF bandwidth shared among the wireless system users. It may be desirable to provide antenna coverage areas in a building or other facility to provide distributed antenna system access to clients within the building or facility. However, it may be desirable to employ optical fiber to distribute communication signals. Benefits of optical fiber include increased bandwidth.

One type of distributed antenna system for creating antenna coverage areas includes distribution of RF communications signals over an electrical conductor medium, such as coaxial cable or twisted pair wiring. Another type of distributed antenna system for creating antenna coverage areas, called "Radio-over-Fiber" or "RoF," utilizes RF communications signals sent over optical fibers. Both types of systems can include head-end equipment coupled to a plurality of remote units (RUs), which may include an antenna and may be referred to as a remote antenna unit or RAU. Each RU provides antenna coverage areas. The RUs can each include RF transceivers coupled to an antenna to transmit RF communications signals wirelessly, wherein the RUs are coupled to the head-end equipment via the communication medium. The RF transceivers in the RUs are transparent to the RF communications signals. The antennas in the RUs also receive RF signals (i.e., electromagnetic radiation) from clients in the antenna coverage area. The RF signals are then sent over the communication medium to the head-end equipment. In optical fiber or RoF distributed antenna systems, the RUs convert incoming optical RF signals from an optical fiber downlink to electrical RF signals via optical-to-electrical (O/E) converters, which are then passed to the RF transceiver. The RUs also convert received electrical RF communications signals from clients via the antennas to optical RF communications signals via electrical-to-optical (E/O) converters. The optical RF signals are then sent over an optical fiber uplink to the head-end equipment.

The RUs contain power-consuming components, such as the RF transceiver, to transmit and receive RF communications signals and thus require power to operate. In the situation of an optical fiber-based distributed antenna system, the RUs may contain O/E and E/O converters that also require power to operate. In some installations, the RU may contain a housing that includes a power supply to provide power to the RUs locally at the RU. The power supply may be configured to be connected to a power source, such as an alternating current (AC) power source, and convert AC power into a direct current (DC) power signal. Alternatively, power may be provided to the RUs from remote power supplies. The remote power supplies may be configured to provide power to multiple RUs. It may be desirable to provide these power supplies in modular units or devices that may be easily inserted or removed from a housing to provide power. Providing modular power distribution modules allows power to more easily be configured as needed for the distributed antenna system. For example, a remotely located power unit may be provided that contains a plurality of ports or slots to allow a plurality of power distribution modules to be inserted therein. The power unit may have ports that allow the power to be provided over an electrical conductor medium to the RUs. Thus, when a power distribution module is inserted into the power unit in a port or slot that corresponds to a given RU, power from the power distribution module is supplied to the RU.

RUs may also provide wired communication ports or provide other services, each of which may require power consumption at the RU. The cumulative effect of all the power consuming components at the RUs may exceed the power provided from the remote power supply. When the power requirements exceed the available power, the RU may shut down and provide no services or may have other disturbances in the operation of the RU.

Even when the remote power source is initially adequate to supply sufficient power to the RUs, some of the power is lost on the wires carrying the power. Additionally, some power supplies may be set to the wrong power setting or have other malfunctions. When an RU is designed to consume power at close to the maximum power available from the remote power supply, it becomes important to verify that the expected power is actually available at the ports of the RU. As noted above, if the power available at the ports is below what is required, the RU may shut down and provide no services, or may have other disturbances in the operation of the RU.

No admission is made that any reference cited herein constitutes prior art. Applicant expressly reserves the right to challenge the accuracy and pertinency of any cited documents.

SUMMARY OF THE DETAILED DESCRIPTION

Embodiments disclosed in the detailed description include power management techniques in distributed communication systems. Related components, systems, and methods are also disclosed. In embodiments disclosed herein, the power available at a remote unit (RU) is measured and compared to the power requirements of the RU. In an exemplary embodiment, voltage and current is measured for two dummy loads at the RU and these values are used to solve for the output voltage of the power supply and the resistance of the wires. From these values, a maximum power available may be calculated and compared to power requirements of the RU.

One embodiment of the disclosure relates to a RU for use in a distributed communication system. The RU is comprised of at least one antenna configured to transmit radio frequency signals into a coverage area. The RU is also comprised of a power unit configured to receive a power signal from a power distribution module through a power medium, a power over Ethernet integrated circuit (POE IC) configured to measure voltage and current from the power input, and a control system. The control system is configured to open a services switch between the power input and a real load, to instruct the POE IC to close a first switch coupling a first load resistance to the power input, to instruct the POE IC to measure a first voltage and a first current associated with the first load resistance, and to instruct the POE IC to open the first switch and close a second switch coupling a second load resistance to the power input. The control system is also configured to instruct the POE IC to measure a second voltage and a second current associated with the second load resistance and to calculate an available power for the RU. The remote unit includes at least one antenna unit for at least one of transmitting signals into and receiving signals from a coverage area.

An additional embodiment of the disclosure relates to a method of managing power in a RU of a distributed communication system. The method comprises opening a services switch associated with a real load and while a first switch associated with a first resistance is closed, measuring a first voltage and first current associated with the first resistance, and while a second switch associated with a second resistance is closed, measuring a second voltage and a second current associated with the second resistance. The method also comprises calculating an available power for the RU based on the first current, the first voltage, the second current and the second voltage.

An additional embodiment of the disclosure relates to a distributed communication system. The distributed communication system comprises a plurality of remote units. Each remote unit comprises at least one antenna configured to transmit radio frequency signals into a coverage area. Each RU is also comprised of a power unit configured to receive a power signal from a power distribution module through a power medium, a power over Ethernet integrated circuit (POE IC) configured to measure voltage and current from the power input, and a control system. The control system is configured to open a services switch between the power input and a real load, to instruct the POE IC to close a first switch coupling a first load resistance to the power input, to instruct the POE IC to measure a first voltage and a first current associated with the first load resistance, and to instruct the POE IC to open the first switch and close a second switch coupling a second load resistance to the power input. The control system is also configured to instruct the POE IC to measure a second voltage and a second current associated with the second load resistance and to calculate an available power for the RU.

Additional features and advantages will be set forth in the detailed description which follows, and in part will be readily apparent to those skilled in the art from the description or recognized by practicing the embodiments as described in the written description and the claims hereof, as well as the appended drawings.

It is to be understood that both the foregoing general description and the following detailed description are merely embodiments, and are intended to provide an overview or framework to understand the nature and character of the claims.

The accompanying drawings are included to provide a further understanding, and are incorporated in and constitute a part of this specification. The drawings illustrate one or more embodiment(s), and together with the description, serve to explain principles and operation of the various embodiments.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts. Various embodiments will be further clarified by the following examples.

Embodiments disclosed in the detailed description include power management techniques in distributed communication systems. Related components, systems, and methods are also disclosed. In embodiments disclosed herein, the power available at a remote unit (RU) is measured and compared to the power requirements of the RU. In an exemplary embodiment, voltage and current is measured for two dummy loads at the RU and these values are used to solve for the output voltage of the power supply and the resistance of the wires. From these values, a maximum power available may be calculated and compared to power requirements of the RU.

While the concepts of the present disclosure are applicable to different types of distributed communication systems, an exemplary embodiment is used in a distributed antenna system and this exemplary embodiment is explored herein. Before discussing an exemplary power management system, exemplary distributed antenna systems capable of distributing radio frequency (RF) communications signals to distributed or remote units (RUs) are first described with regard to FIGS. 1-3. It should be appreciated that in an exemplary embodiment the RUs may contain antennas such that the RU is a remote antenna unit and may be referred to as a RAU.

Figure 1:
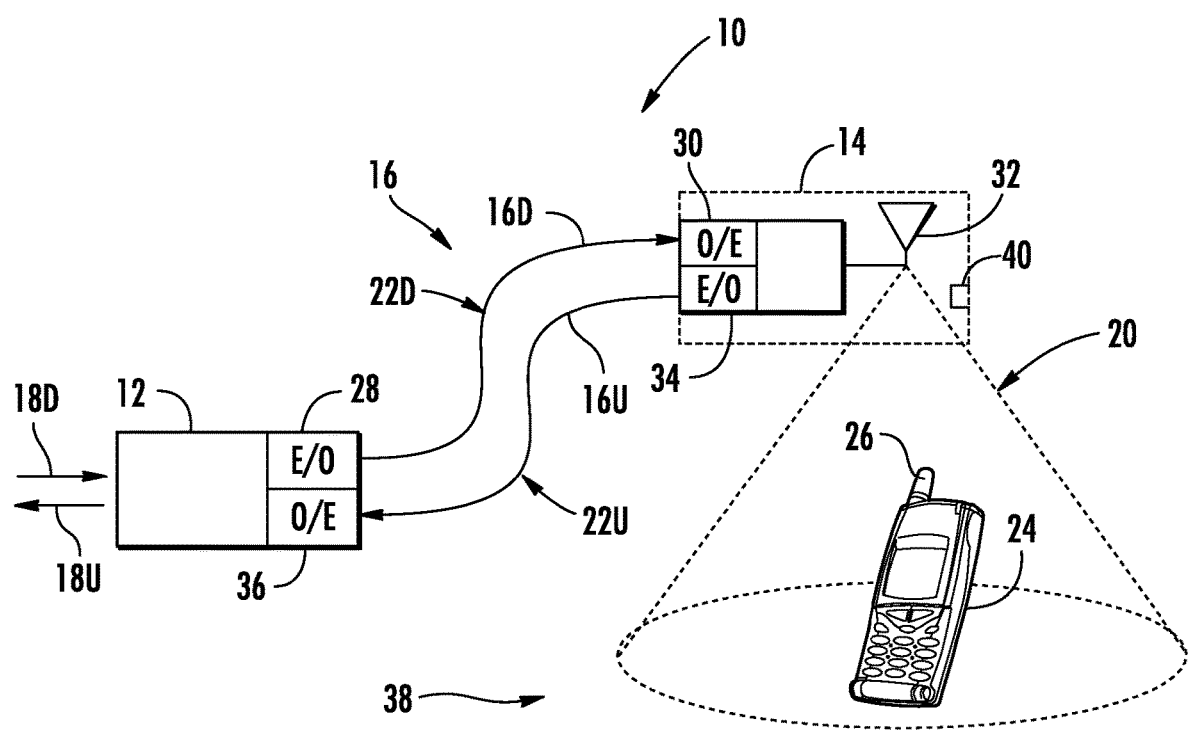
FIG. 1 is a schematic diagram of an exemplary distributed antenna system.
Figure 2A:
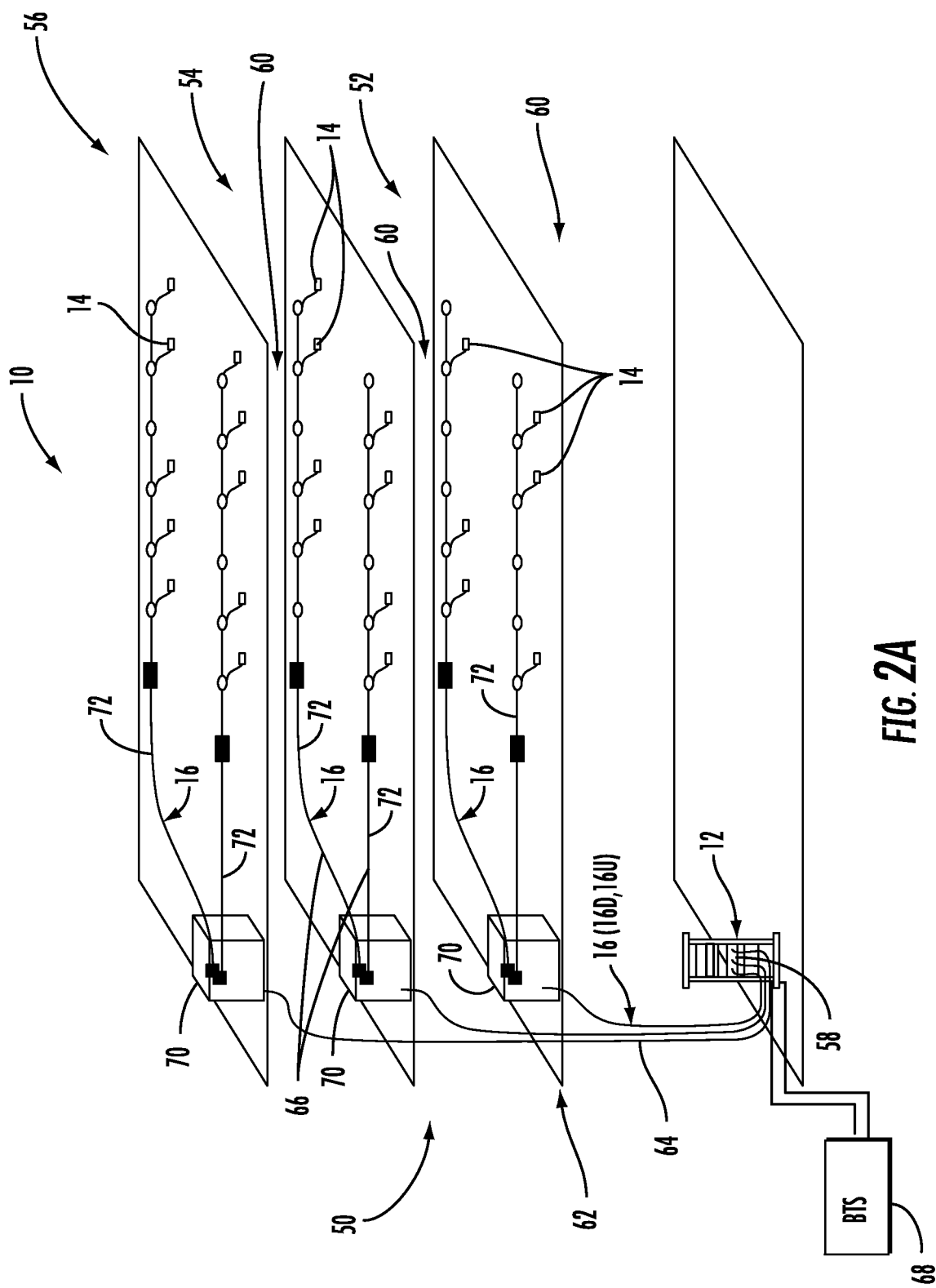
FIG. 2A is a partially schematic cut-away diagram of an exemplary building infrastructure in which the distributed antenna system in FIG. 1 can be employed.
Figure 2B:
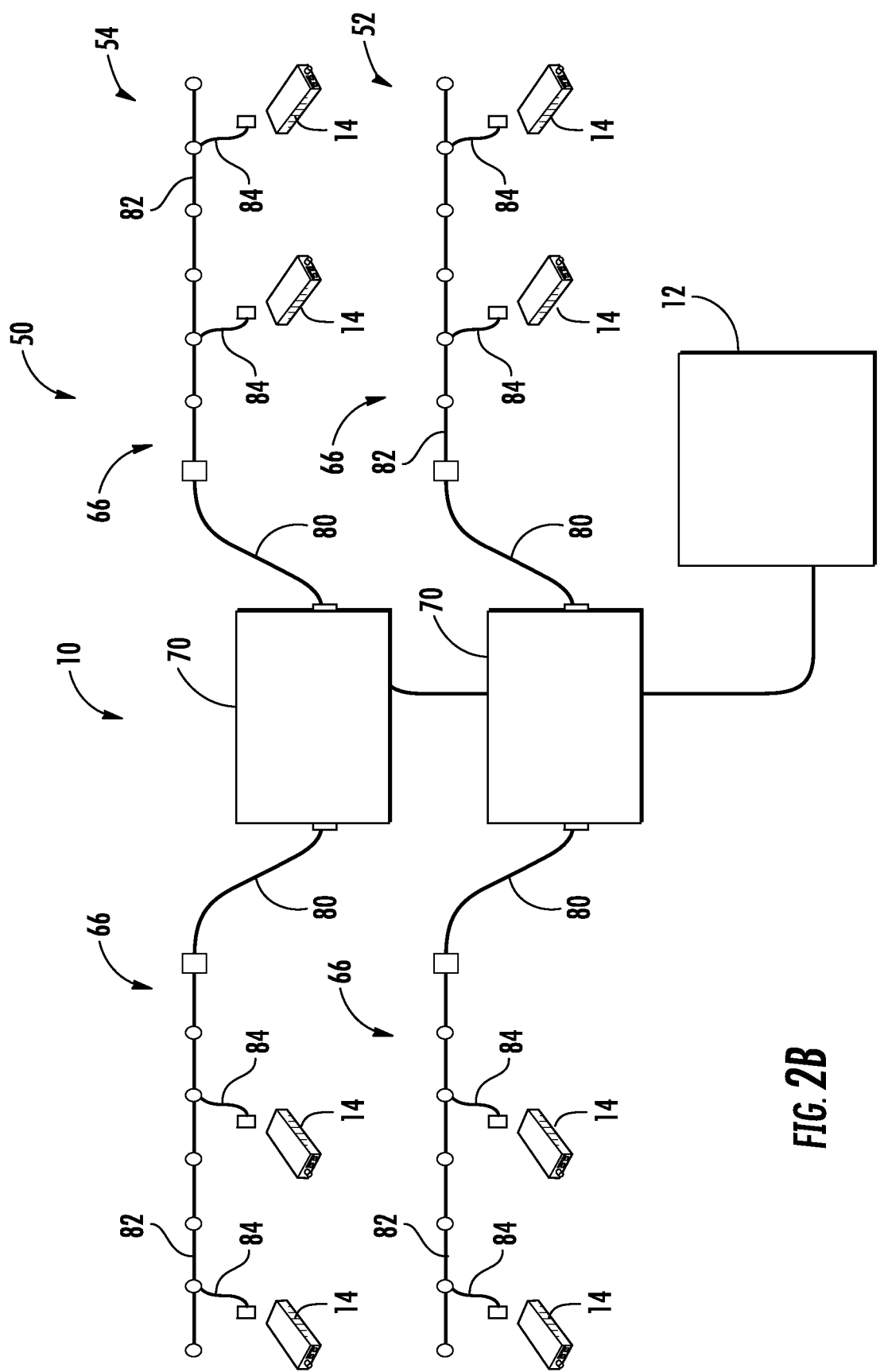
FIG. 2B is an alternative diagram of the distributed antenna system in FIG. 2A.
Figure 3:
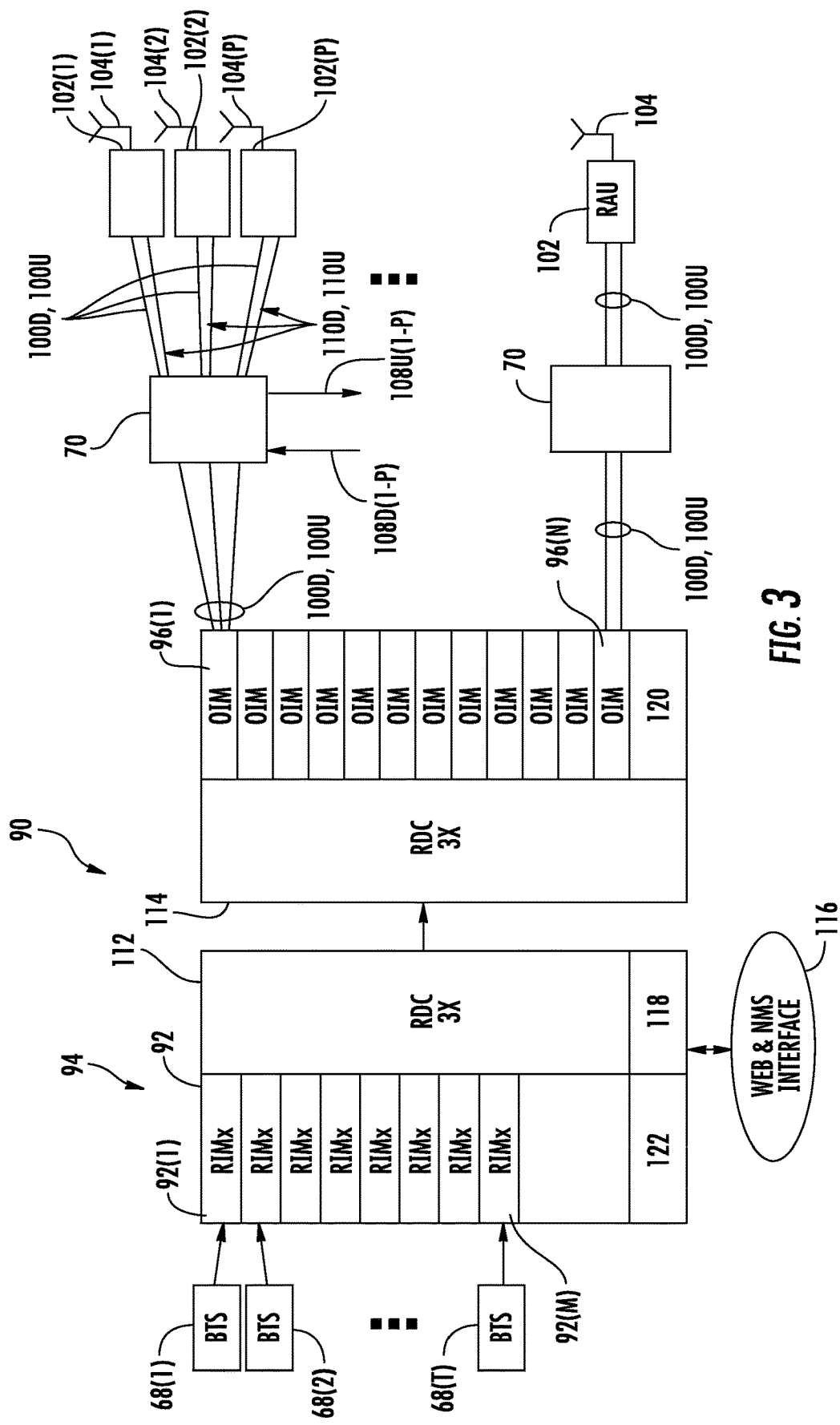
FIG. 3 is a schematic diagram of providing digital data services and radio frequency (RF) communication services to remote units (RUs) or other remote communications devices in the distributed antenna system of FIG. 1.

In this regard, the distributed antenna systems in FIGS. 1-3 can include power units located remotely from RUs that provide power to the RUs for operation. Embodiments of power management modules in a distributed communication system, including the distributed antenna systems in FIGS. 1-3, begin with FIG. 4. The distributed antenna systems in FIGS. 1-3 discussed below include distribution of RF communications signals; however, the distributed antenna systems are not limited to distribution of RF communications signals. Also note that while the distributed antenna systems in FIGS. 1-3 discussed below include distribution of communications signals over optical fiber, these distributed antenna systems are not limited to distribution over optical fiber. Distribution mediums could also include, but are not limited to, coaxial cable, twisted-pair conductors, wireless transmission and reception, and any combination thereof. Also, any combination can be employed that also involves optical fiber for portions of the distributed antenna system.

In this regard, FIG. 1 is a schematic diagram of an embodiment of a distributed antenna system. In this embodiment, the system is an optical fiber-based distributed antenna system 10. The distributed antenna system 10 is configured to create one or more antenna coverage areas for establishing communications with wireless client devices located in the RF range of the antenna coverage areas. The distributed antenna system 10 provides RF communication services (e.g., cellular services). In this embodiment, the distributed antenna system 10 includes head-end equipment (HEE) 12 such as a head-end unit (HEU), one or more RUs 14, and an optical fiber 16 that optically couples the HEE 12 to the RU 14. The RU 14 is a type of remote communications unit. In general, a remote communications unit can support wireless communications, wired communications, or both. The RU 14 can support wireless communications and may also support wired communications through wired service port 40. The HEE 12 is configured to receive communications over downlink electrical RF signals 18D from a source or sources, such as a network or carrier as examples, and provide such communications to the RU 14. The HEE 12 is also configured to return communications received from the RU 14, via uplink electrical RF signals 18U, back to the source or sources. In this regard in this embodiment, the optical fiber 16 includes at least one downlink optical fiber 16D to carry signals communicated from the HEE 12 to the RU 14 and at least one uplink optical fiber 16U to carry signals communicated from the RU 14 back to the HEE 12.

One downlink optical fiber 16D and one uplink optical fiber 16U could be provided to support multiple channels each using wave-division multiplexing (WDM), as discussed in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Other options for WDM and frequency-division multiplexing (FDM) are disclosed in U.S. patent application Ser. No. 12/892,424, any of which can be employed in any of the embodiments disclosed herein. Further, U.S. patent application Ser. No. 12/892,424 also discloses distributed digital data communications signals in a distributed antenna system which may also be distributed in the optical fiber-based distributed antenna system 10 either in conjunction with RF communications signals or not.

The optical fiber-based distributed antenna system 10 has an antenna coverage area 20 that can be disposed about the RU 14. The antenna coverage area 20 of the RU 14 forms an RF coverage area 38. The HEE 12 is adapted to perform or to facilitate any one of a number of Radio-over-Fiber (RoF) applications, such as RF identification (RFID), wireless local-area network (WLAN) communication, or cellular phone service. Shown within the antenna coverage area 20 is a client device 24 in the form of a mobile device as an example, which may be a cellular telephone as an example. The client device 24 can be any device that is capable of receiving RF communications signals. The client device 24 includes an antenna 26 (e.g., a wireless card) adapted to receive and/or send electromagnetic RF signals.

With continuing reference to FIG. 1, to communicate the electrical RF signals over the downlink optical fiber 16D to the RU 14, to in turn be communicated to the client device 24 in the antenna coverage area 20 formed by the RU 14, the HEE 12 includes a radio interface in the form of an electrical-to-optical (E/O) converter 28. The E/O converter 28 converts the downlink electrical RF signals 18D to downlink optical RF signals 22D to be communicated over the downlink optical fiber 16D. The RU 14 includes an optical-to-electrical (O/E) converter 30 to convert received downlink optical RF signals 22D back to electrical RF signals to be communicated wirelessly through an antenna 32 of the RU 14 to client devices 24 located in the antenna coverage area 20.

Similarly, the antenna 32 is also configured to receive wireless RF communications from client devices 24 in the antenna coverage area 20. In this regard, the antenna 32 receives wireless RF communications from client devices 24 and communicates electrical RF signals representing the wireless RF communications to an E/O converter 34 in the RU 14. The E/O converter 34 converts the electrical RF signals into uplink optical RF signals 22U to be communicated over the uplink optical fiber 16U. An O/E converter 36 provided in the HEE 12 converts the uplink optical RF signals 22U into uplink electrical RF signals, which can then be communicated as uplink electrical RF signals 18U back to a network or other source.

To provide further exemplary illustration of how a distributed antenna system can be deployed indoors, FIG. 2A is provided. FIG. 2A is a partially schematic cut-away diagram of a building infrastructure 50 employing an optical fiber-based distributed antenna system. The system may be the optical fiber-based distributed antenna system 10 of FIG. 1. The building infrastructure 50 generally represents any type of building in which the optical fiber-based distributed antenna system 10 can be deployed. As previously discussed with regard to FIG. 1, the optical fiber-based distributed antenna system 10 incorporates the HEE 12 to provide various types of communication services to coverage areas within the building infrastructure 50, as an example.

For example, as discussed in more detail below, the distributed antenna system 10 in this embodiment is configured to receive wireless RF signals and convert the RF signals into RoF signals to be communicated over the optical fiber 16 to multiple RUs 14. The optical fiber-based distributed antenna system 10 in this embodiment can be, for example, an indoor distributed antenna system (IDAS) to provide wireless service inside the building infrastructure 50. These wireless signals can include cellular service, wireless services such as RFID tracking, Wireless Fidelity (WiFi), local area network (LAN), WLAN, public safety, wireless building automations, and combinations thereof, as examples.

With continuing reference to FIG. 2A, the building infrastructure 50 in this embodiment includes a first (ground) floor 52, a second floor 54, and a third floor 56. The floors 52, 54, 56 are serviced by the HEE 12 through a main distribution frame 58 to provide antenna coverage areas 60 in the building infrastructure 50. Only the ceilings of the floors 52, 54, 56 are shown in FIG. 2A for simplicity of illustration. In the example embodiment, a main cable 62 has a number of different sections that facilitate the placement of a large number of RUs 14 in the building infrastructure 50. Each RU 14 in turn services its own coverage area in the antenna coverage areas 60. The main cable 62 can include, for example, a riser cable 64 that carries all of the downlink and uplink optical fibers 16D, 16U to and from the HEE 12. The riser cable 64 may be routed through a power unit 70. The power unit 70 may also be configured to provide power to the RUs 14 via an electrical power line provided inside an array cable 72, or tail cable or home-run tether cable as other examples, and distributed with the downlink and uplink optical fibers 16D, 16U to the RUs 14. For example, as illustrated in the building infrastructure 50 in FIG. 2B, a tail cable 80 may extend from the power units 70 into an array cable 82. Downlink and uplink optical fibers in tether cables 84 of the array cables 82 are routed to each of the RUs 14, as illustrated in FIG. 2B. Referring back to FIG. 2A, the main cable 62 can include one or more multi-cable (MC) connectors adapted to connect select downlink and uplink optical fibers 16D, 16U, along with an electrical power line, to a number of optical fiber cables 66.

With continued reference to FIG. 2A, the main cable 62 enables multiple optical fiber cables 66 to be distributed throughout the building infrastructure 50 (e.g., fixed to the ceilings or other support surfaces of each floor 52, 54, 56) to provide the antenna coverage areas 60 for the first, second, and third floors 52, 54, and 56. In an example embodiment, the HEE 12 is located within the building infrastructure 50 (e.g., in a closet or control room), while in another example embodiment, the HEE 12 may be located outside of the building infrastructure 50 at a remote location. A base transceiver station (BTS) 68, which may be provided by a second party such as a cellular service provider, is connected to the HEE 12, and can be co-located or located remotely from the HEE 12. A BTS (such as BTS 68) is any station or signal source that provides an input signal to the HEE 12 and can receive a return signal from the HEE 12.

In a typical cellular system, for example, a plurality of BTSs is deployed at a plurality of remote locations to provide wireless telephone coverage. Each BTS serves a corresponding cell and when a mobile client device enters the cell, the BTS communicates with the mobile client device. Each BTS can include at least one radio transceiver for enabling communication with one or more subscriber units operating within the associated cell. As another example, wireless repeaters or bi-directional amplifiers could also be used to serve a corresponding cell in lieu of a BTS. Alternatively, radio input could be provided by a repeater, picocell, or femtocell as other examples.

The optical fiber-based distributed antenna system 10 in FIGS. 1-2B and described above provides point-to-point communications between the HEE 12 and the RU 14. A multi-point architecture is also possible as well. With regard to FIGS. 1-2B, each RU 14 communicates with the HEE 12 over a distinct downlink and uplink optical fiber pair to provide the point-to-point communications. Whenever an RU 14 is installed in the optical fiber-based distributed antenna system 10, the RU 14 is connected to a distinct downlink and uplink optical fiber pair connected to the HEE 12. The downlink and uplink optical fibers 16D, 16U may be provided in a fiber optic cable. Multiple downlink and uplink optical fiber pairs can be provided in a fiber optic cable to service multiple RUs 14 from a common fiber optic cable.

For example, with reference to FIG. 2A, RUs 14 installed on a given floor 52, 54, or 56 may be serviced from the same optical fiber 16. In this regard, the optical fiber 16 may have multiple nodes where distinct downlink and uplink optical fiber pairs can be connected to a given RU 14.

The HEE 12 may be configured to support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

FIG. 3 is a schematic diagram of another exemplary optical fiber-based distributed antenna system 90 that may be employed according to the embodiments disclosed herein to provide RF communication services. In this embodiment, the optical fiber-based distributed antenna system 90 includes optical fiber for distributing RF communication services. The optical fiber-based distributed antenna system 90 in this embodiment is comprised of three (3) main components. One or more radio interfaces provided in the form of radio interface modules (RIMs) 92(1)-92(M) in this embodiment are provided in HEE 94 to receive and process downlink electrical RF communications signals prior to optical conversion into downlink optical RF communications signals. The RIMs 92(1)-92(M) provide both downlink and uplink interfaces. The processing of the downlink electrical RF communications signals can include any of the processing previously described above in the HEE 12 in FIGS. 1-2A. The notation "1-M" indicates that any number of the referenced component, 1-M may be provided. The HEE 94 is configured to accept a plurality of RIMs 92(1)-92(M) as modular components that can easily be installed and removed or replaced in the HEE 94. In one embodiment, the HEE 94 is configured to support up to eight (8) RIMs 92(1)-92(M).

With continuing reference to FIG. 3, each RIM 92(1)-92(M) can be designed to support a particular type of radio source or range of radio sources (i.e., frequencies) to provide flexibility in configuring the HEE 94 and the optical fiber-based distributed antenna system 90 to support the desired radio sources. For example, one RIM 92 may be configured to support the Personal Communication Services (PCS) radio band. Another RIM 92 may be configured to support the 700 MHz radio band. In this example, by inclusion of these RIMs 92, the HEE 94 would be configured to support and distribute RF communications signals on both PCS and LTE 700 radio bands. RIMs 92 may be provided in the HEE 94 that support any frequency bands desired, including but not limited to the US Cellular band, PCS band, Advanced Wireless Services (AWS) band, 700 MHz band, Global System for Mobile communications (GSM) 900, GSM 1800, and Universal Mobile Telecommunication System (UMTS). RIMs 92 may be provided in the HEE 94 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD). RIMs 92 may be provided in the HEE 94 that support any frequencies desired referenced above as non-limiting examples.

With continuing reference to FIG. 3, the downlink electrical RF communications signals are provided to a plurality of optical interfaces provided in the form of optical interface modules (OIMs) 96(1)-96(N) in this embodiment to convert the downlink electrical RF communications signals into downlink optical RF communications signals 100D. The notation "1-N" indicates that any number of the referenced component 1-N may be provided. The OIMs 96 may be configured to provide one or more optical interface components (OICs) that contain O/E and E/O converters, as will be described in more detail below. The OIMs 96 support the radio bands that can be provided by the RIMs 92, including the examples previously described above. Thus, in this embodiment, the OIMs 96 may support a radio band range from 400 MHz to 2700 MHz, as an example, so providing different types or models of OIMs 96 for narrower radio bands to support possibilities for different radio band-supported RIMs 92 provided in the HEE 94 is not required. Further, the OIMs 96 may be optimized for sub-bands within the 400 MHz to 2700 MHz frequency range, such as 400-700 MHz, 700 MHz-1 GHz, 1 GHz-1.6 GHz, and 1.6 GHz-2.7 GHz, as examples.

The OIMs 96(1)-96(N) each include E/O converters to convert the downlink electrical RF communications signals to downlink optical RF communications signals 100D. The downlink optical RF communications signals 100D are communicated over downlink optical fiber(s) to a plurality of RUs 102(1)-102(P). The notation "1-P" indicates that any number of the referenced component 1-P may be provided. O/E converters provided in the RUs 102(1)-102(P) convert the downlink optical RF communications signals 100D back into downlink electrical RF communications signals, which are provided over downlinks coupled to antennas 104(1)-104(P) in the RUs 102(1)-102(P) to client devices 24 (shown in FIG. 1) in the reception range of the antennas 104(1)-104(P).

E/O converters are also provided in the RUs 102(1)-102(P) to convert uplink electrical RF communications signals received from client devices through the antennas 104(1)-104(P) into uplink optical RF communications signals 100U to be communicated over uplink optical fibers to the OIMs 96(1)-96(N). The OIMs 96(1)-96(N) include O/E converters that convert the uplink optical RF communications signals 100U into uplink electrical RF communications signals that are processed by the RIMs 92(1)-92(M) and provided as uplink electrical RF communications signals. Downlink electrical digital signals 108D(1)-108D(P) communicated over downlink electrical medium or media (hereinafter "medium") 110D are provided to the RUs 102(1)-102(P), separately from the RF communication services, as well as uplink electrical digital signals 108U(1)-108U(P) communicated over uplink electrical medium 110U, as also illustrated in FIG. 3. Power may be provided in the downlink and/or uplink electrical medium 110D and/or 110U to the RUs 102(1)-102(P).

In one embodiment, up to thirty-six (36) RUs 102 can be supported by the OIMs 96, three RUs 102 per OIM 96 in the optical fiber-based distributed antenna system 90 in FIG. 3. The optical fiber-based distributed antenna system 90 is scalable to address larger deployments. In the illustrated optical fiber-based distributed antenna system 90, the HEE 94 is configured to support up to thirty six (36) RUs 102 and fit in 6U rack space (U unit meaning 1.75 inches of height). The downlink operational input power level can be in the range of −15 dBm to 33 dBm. The adjustable uplink system gain range can be in the range of +15 dB to −15 dB. The RF input interface in the RIMs 92 can be duplexed and simplex, N-Type. The optical fiber-based distributed antenna system can include sectorization switches to be configurable for sectorization capability, as discussed in U.S. patent application Ser. No. 12/914,585 filed on Oct. 28, 2010, and entitled "Sectorization In Distributed Antenna Systems, and Related Components and Method," which is incorporated herein by reference in its entirety.

In another embodiment, an exemplary RU 102 may be configured to support up to four (4) different radio bands/carriers (e.g. ATT, VZW, TMobile, Metro PCS: 700LTE/850/1900/2100). Radio band upgrades can be supported by adding remote expansion units over the same optical fiber (or upgrade to MIMO on any single band). The RUs 102 and/or remote expansion units may be configured to provide external filter interface to mitigate potential strong interference at 700 MHz band (Public Safety, CH51,56); Single Antenna Port (N-type) provides DL output power per band (Low bands (<1 GHz): 14 dBm, High bands (>1 GHz): 15 dBm); and satisfies the UL System RF spec (UL Noise Figure: 12 dB, UL IIP3: −5 dBm, UL AGC: 25 dB range).

As further illustrated in FIG. 3, a power supply module (PSM) 118 may provide power to the RIMs 92(1)-92(M) and radio distribution cards (RDCs) 112 that distribute the RF communications from the RIMs 92(1)-92(M) to the OIMs 96(1)-96(N) through RDCs 114. In one embodiment, the RDCs 112, 114 can support different sectorization needs. A PSM 120 may also be provided to provide power to the OIMs 96(1)-96(N). An interface 116, which may include web and network management system (NMS) interfaces, may also be provided to allow configuration and communication to the RIMs 92(1)-92(M) and other components of the optical fiber-based distributed antenna system 90. A microcontroller, microprocessor, or other control circuitry, called a head-end controller (HEC) 122 may be included in HEE 94 to provide control operations for the HEE 94.

RUs, including the RUs 14, 102 discussed above, contain power-consuming components for transmitting and receiving RF communications signals. In the situation of an optical fiber-based distributed antenna system, the RUs 14, 102 may contain O/E and E/O converters that also require power to operate. As an example, a RU 14, 102 may contain a power unit that includes a power supply to provide power to the RUs 14, 102 locally at the RU 14, 102. Alternatively, power may be provided to the RUs 14, 102 from power supplies provided in remote power units such as power units 70. In either scenario, it may be desirable to provide these power supplies in modular units or devices that may be easily inserted or removed from a power unit. Providing modular power distribution modules allows power to more easily be configured as needed for the distributed antenna system.

Figure 4:
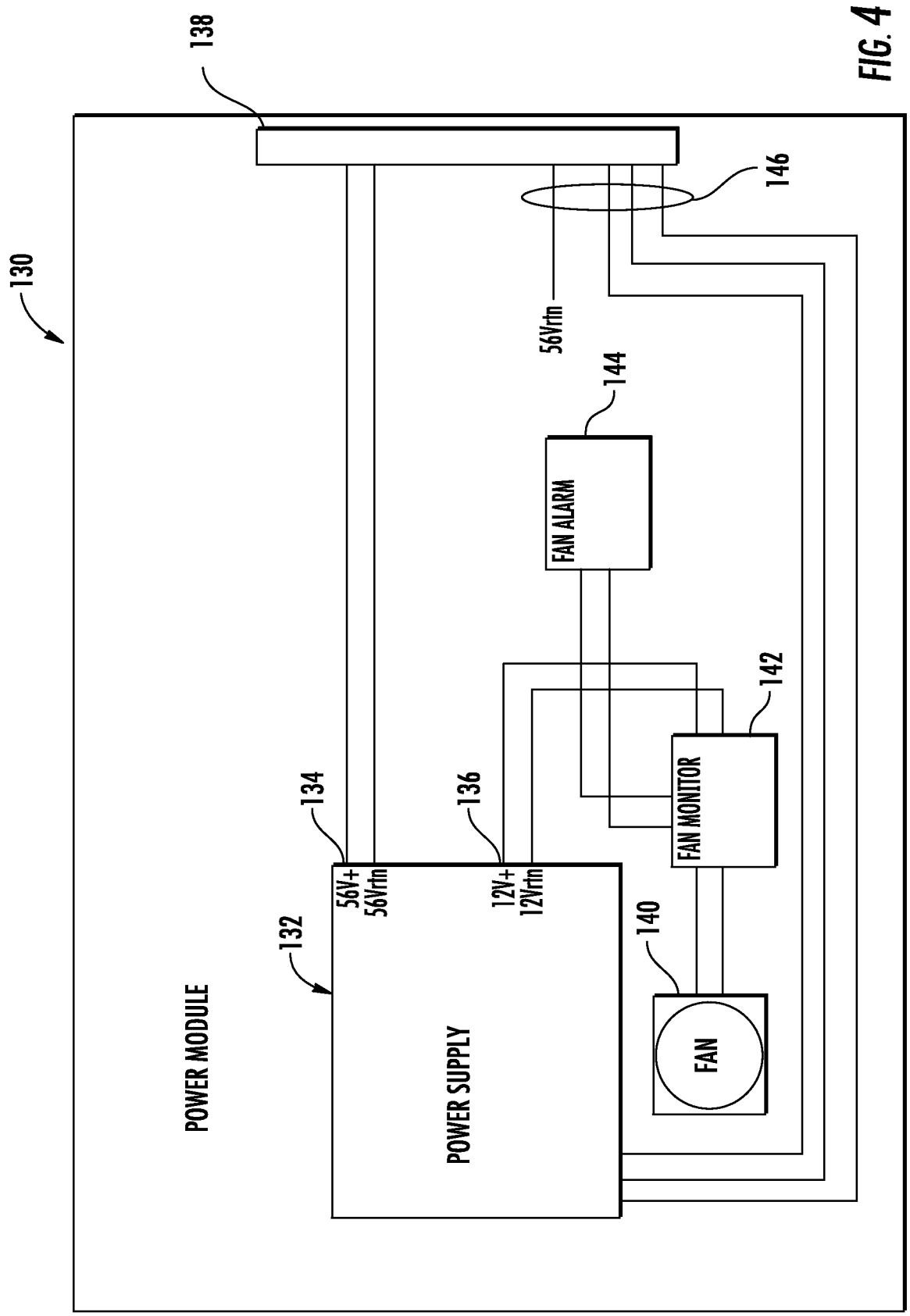
FIG. 4 is a schematic diagram of an exemplary power distribution module that is supported by an exemplary power unit.

In this regard, FIG. 4 is a schematic diagram of an exemplary power distribution module 130 that can be employed to provide power to the RUs 14, 102 or other power-consuming DAS components, including those described above. In this embodiment, the power distribution module 130 may be the power unit 70 previously described above to remotely provide power to the RUs 14, 102. The power unit 70 may be comprised of a chassis or other housing that is configured to support power distribution modules 130. The power distribution module 130 may include a power supply unit 132 that has a plurality of outputs 134, 136. The output 134 may be connected to a port 138. In an exemplary embodiment, the port 138 is a multi-connector port configured to accommodate a conventional plug such as a CAT 5 or CAT 6 plug and includes conductive elements configured to carry power.

The output 136 may have a reduced voltage relative to output 134 (e.g., 12 V compared to 56 V) and be coupled to a fan 140 with associated fan monitor 142 and fan alarm 144. The port 138 may further include conductive elements 146 configured to carry return signals from the RU 14, 102. While FIG. 4 illustrates an exemplary power distribution module 130, it should be appreciated that other power supply configurations may be used with embodiments of the present disclosure.

Figure 5:
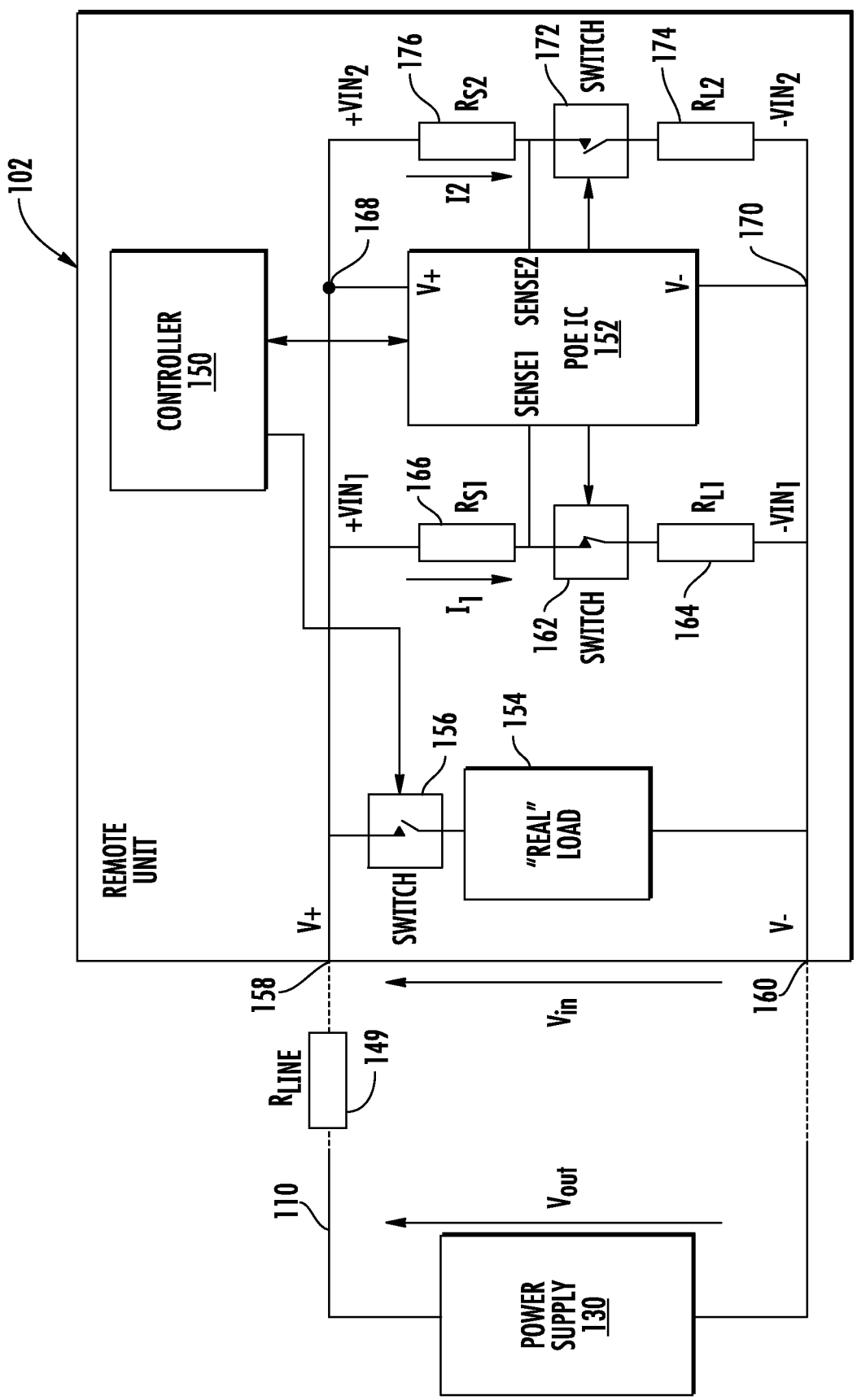
FIG. 5 is a schematic diagram of an exemplary power management module according to an exemplary embodiment of the present disclosure.

The power distribution module 130 provides power to the RU 102 through the electrical medium 110 as shown in FIG. 3 or 5. As illustrated in FIG. 5, the electrical medium 110 has a resistance $R_{LINE}$ 149 which dissipates power thereby reducing the power that is available at the RU 102. The present disclosure provides, in exemplary embodiments, systems and techniques through which the power available at the RU 102 may be calculated and appropriate remedial action (if any) taken. In particular, in an exemplary embodiment, an alarm may be generated so that correction may be made. One such alarm may be a local light being illuminated. An alternate alarm may be a report via a management or telemetry channel to a central management system. In another exemplary embodiment, the RU 102 may prioritize services provided by the RU 102 and shut down lower priority services to prevent the other services supported by RU 102 from shutting down or having other anomalous and undesired operational behavior. In still another alternate and non-exclusive embodiment, the resistance value of $R_{LINE}$ 149 may be reported to a central facility for future planning purposes. That is, the system operators may review the $R_{LINE}$ 149 value when evaluating whether a potential upgrade is feasible at a particular RU 102. For example, if $R_{LINE}$ 149 is high and there are already several services at a particular RU 102, then it may not be practical to add a service to that RU 102 unless an additional power source is provided. Still other planning decisions can be made as desired.

In this regard, the RU 102 includes a controller 150 and a power over Ethernet integrated circuit (POE IC) 152. In an exemplary embodiment, the POE IC may be the LTC4266IUHF#PBF sold by Linear Technology of 1630 McCarthy Blvd. Milpitas, Calif. 95035-7417. At the time of writing, the specification for this part was available at www.linear.com/product/LTC4266 and the datasheet was available at cds.linear.com/docs/en/datasheet/4266fd.pdf. The datasheet is herein incorporated by reference in its entirety. Other POE IC may also be used.

With continued reference to FIG. 5, the RU 102 includes a "real" load 154 selectively coupled to incoming power via switch 156. Switch 156 is sometimes referred to herein as a services switch. The "real" load 154 may include the O/E and E/O converters, RF transceivers, processors, and other elements that provide the primary services and functionality of the RU 102. The services may include cellular services such as those enumerated above, radio frequency communication services, WiFi, Ethernet, location based services, and the like. The services may be embodied in separate modules, separate circuit boards, antennas, or the like. As these services are conventional, further explanation of them is omitted. The switch 156 is operatively controlled by the controller 150.

With continued reference to FIG. 5, POE IC 152 includes a current sensor and a voltage sensor. When it is desired to calculate the available power at the RU 102, and specifically Pin at ports 158, 160, the controller 150 disconnects the "real" load 154 by opening switch 156 and instructs the POE IC 152 to close switch 162 and connect load $R_{L1}$ 164 to the ports 158, 160 through the current sensing resistor $R_{s1}$ 166. The POE IC 152 then measures the voltage on the sensing resistor $R_{s1}$ 166 and the voltage $V_{in1}$ at the nodes 168, 170, where $V_{in1} = V^+ - V^-$. Note that the nodes 168, 170 correspond to the ports 158, 160. Since the resistance of sensing resistor $R_{s1}$ 166 is known, the current $I_1$ can be calculated by the ratio between the voltage measured on the resistor to the resistance of the resistor. Based on this truth, the following equation can be formulated.

$$V_{in1} = V_{out} - I_1 * R_{LINE} \quad (1)$$

With continued reference to FIG. 5, the controller 150 then instructs the POE IC 152 to open switch 162 and close switch 172, which connects load $R_{L2}$ 174 to the ports 158, 160 through the current sensing resistor $R_{s2}$ 176. The POE IC 152 then measures the voltage on the sensing resistor $R_{s2}$ 176 and the voltage $V_{in2}$ at the nodes 168, 170, where $V_{in2} = V^+ - V^-$. Since the resistance of sensing resistor $R_{s2}$ 176 is known, the current $I_2$ can be calculated by the ratio between the voltage measured on the resistor to the resistance of the resistor. Based on this truth, the following equation can be formulated.

$$V_{in2} = V_{out} - I_2 * R_{LINE} \quad (2)$$

By simultaneous solution of Eq. 1 and Eq. 2, $V_{out}$ and $R_{LINE}$ can be found. Then the available power at the ports 158, 160 can be calculated for any given current consumption I by solving:

$$P_{in} = I * V_{out} - I^2 * R_{LINE} \quad (3)$$

When the process is finished, both switches 162, 172 are opened and switch 156 may be closed for normal operation. If the power $P_{in}$ is not sufficient for the operating of the "real" load 154, the RU 102 may disconnect some lower priority services within the "real" load 154. In an exemplary embodiment, $R_{L1}$ 164 and $R_{L2}$ 174 are 4.7 kΩ and 680Ω respectively. Note that these values are exemplary and may vary as needed or desired, although in general, a resistance of at least 650Ω is required coupled with enough spacing between the values for resistors 164, 174 for a meaningful measurement to be made. Thus, the exemplary values for these resistances may vary by about 10%. These values for the resistors 164, 174 are chosen to allow the power dissipated during the current and voltage measurements to meet the pulse power rating of the power resistors 164, 174 and not be physically too large within the device. In an exemplary embodiment, the resistors are the PWC2010-4K7JI and the PWC2010-680RI sold by TT Electronics of Clive House, 12-18 Queens Road, Weybridge, Surrey, KT13 9XB, England.

Figure 6:
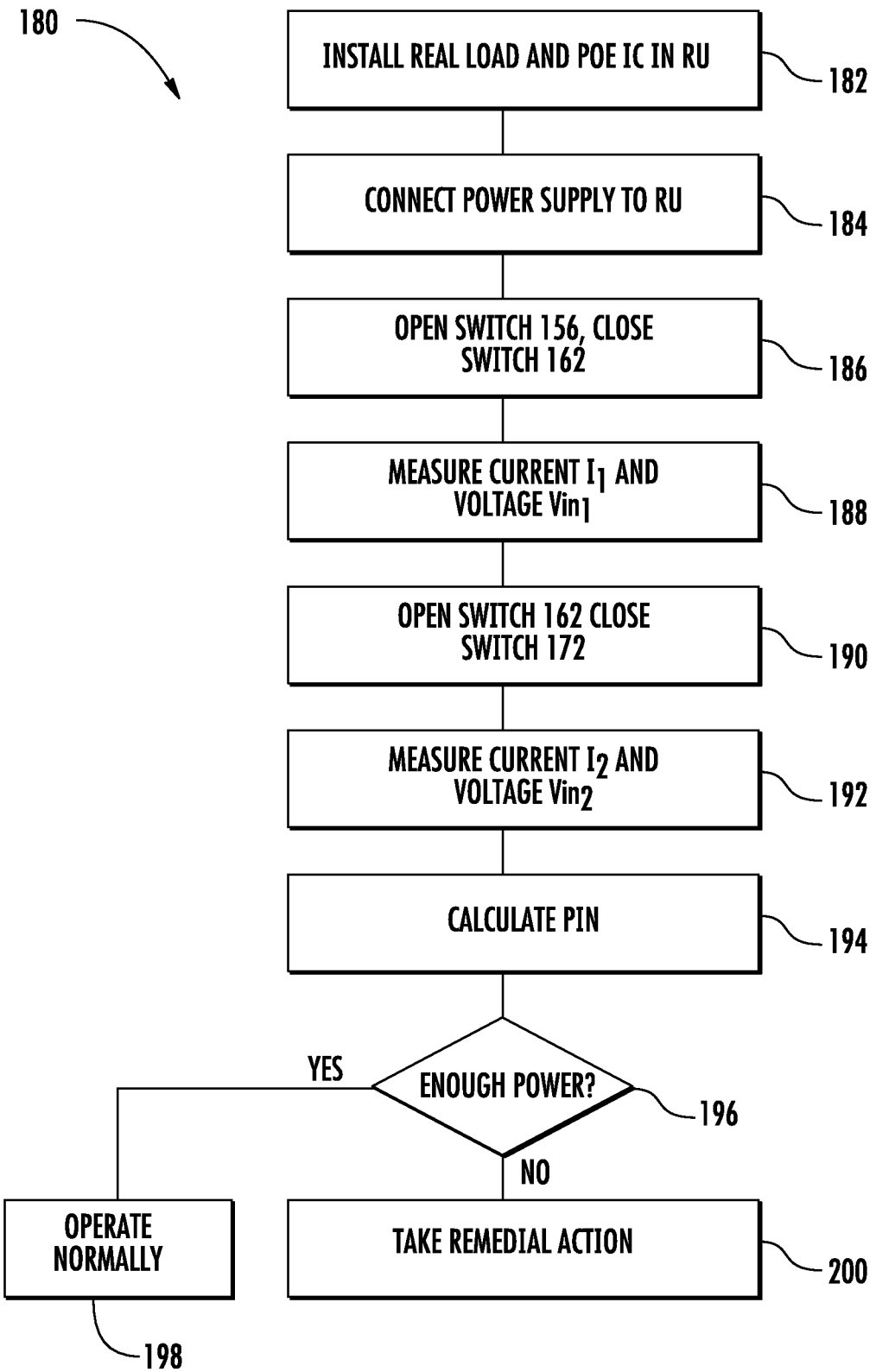
FIG. 6 is a flow chart of an exemplary process used by a power management module according to FIG. 5.

While the above explanation sets forth the process through which the available power may be calculated, FIG. 6 provides a flow chart of the process 180 more explicitly. The process 180 begins when the "real" load 154 having services and functions and POE IC 152 are installed in the RU 102 (block 182). Note that installation of such services may be a new installation of a new RU 102 or an additional service being added to an existing and previously deployed RU 102. In an exemplary embodiment, power will have been disconnected from the RU 102 or not yet have been attached. Accordingly, the power is connected to the RU 102 (block 184).

With continued reference to FIG. 6, the controller 150 opens the switch 156 and closes (through the POE IC 152) switch 162 (block 186). Stated another way, the controller 150 deactivates all services and functions of the RU 102 (except the power sensing process herein described) by opening the switch 162. The controller 150 then measures, using the POE IC 152, the current $I_1$ and the voltage $V_{in1}$ (block 188). The controller 150 then opens switch 162 and closes switch 172 (block 190). The controller 150 measures, through POE IC 152, the current $I_2$ and the voltage $V_{in2}$ (block 192). From the two measurements, the controller 150 may calculate the maximum power available $P_{in}$ at the RU 102 (block 194). The calculation is a function of two equations with two unknowns and becomes a routine solution as shown above.

With continued reference to FIG. 6, the controller 150 can compare available $P_{in}$ to the expected power demands of the "real" load 154 (block 196). If the answer to the comparison is positive, that there is enough power, then the RU 102 may operate normally (block 198). If, however, the answer is negative, that the power required by the "real" load 154 exceeds $P_{in}$, then the controller 150 may take remedial action (block 200).

In exemplary embodiments, remedial actions include reducing transmission power of one or more of the services or functions within the "real" load 154, shutting off completely one or more of the services or functions within the "real" load 154, or generating an alarm. As noted above, the calculated $R_{LINE}$ may also be reported and saved for future planning purposes.

In an alternate embodiment, the power supply output voltage $V_{OUT}$ may be known (from direct measurement, prior calculations, or the like) in which case only a single equation is needed to solve for the unknown variable $R_{LINE}$. Having to solve for only one variable means that only one equation is needed.

Figure 7:
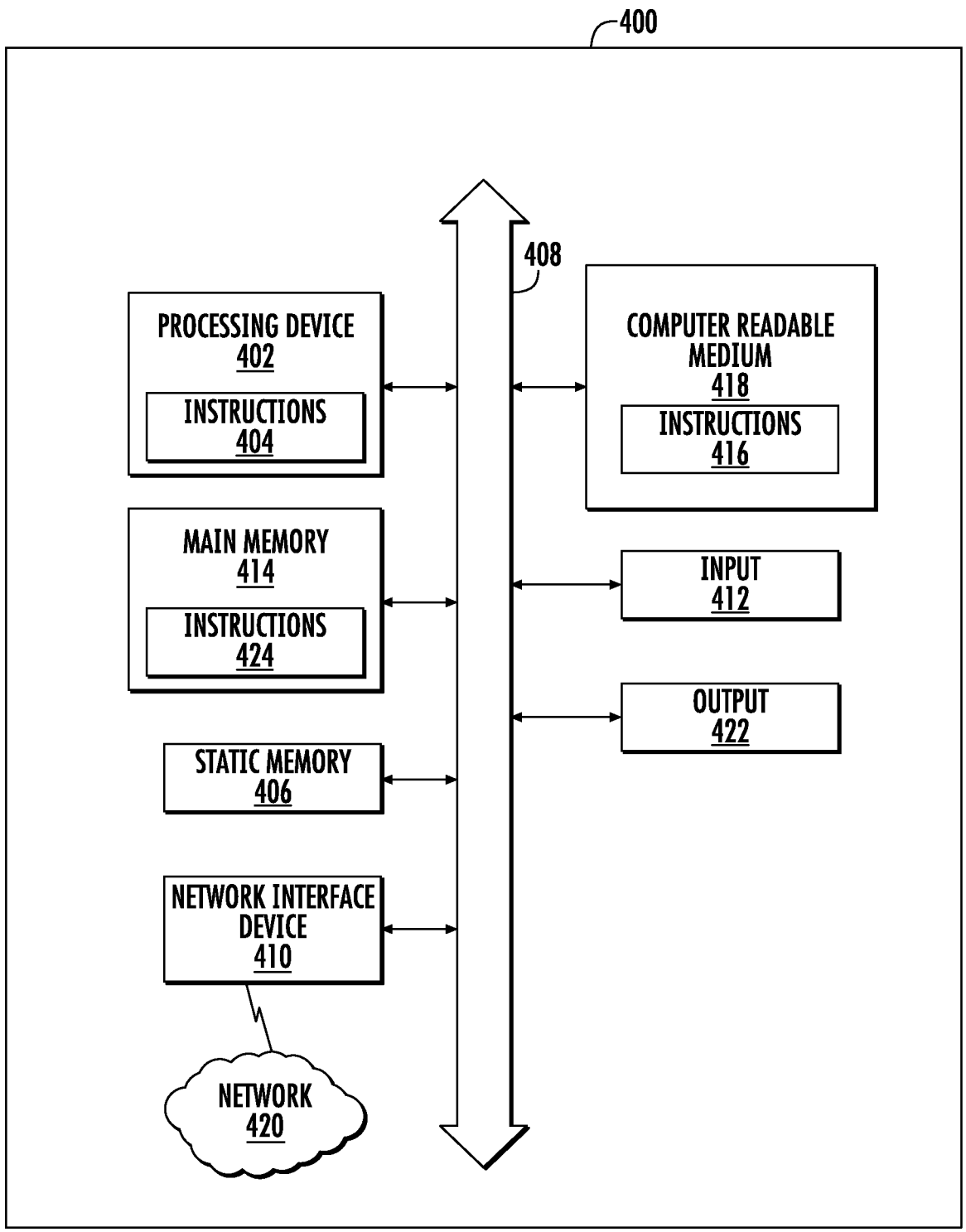
FIG. 7 is a schematic diagram of a generalized representation of an exemplary computer system that can be used for controlling the power distribution modules disclosed herein, wherein the exemplary computer system is adapted to execute instructions from an exemplary computer-readable media.

FIG. 7 is a schematic diagram representation of additional detail regarding an exemplary computer system 400 that may be included in the power distribution module 130 or the RU 102. The computer system 400 is adapted to execute instructions from an exemplary computer-readable medium to perform power management functions. In this regard, the computer system 400 may include a set of instructions for causing the controller 150 to enable and disable the services or functions within the "real" load 154, as previously described. The RU 102 or power distribution module 130 may be connected (e.g., networked) to other machines in a LAN, an intranet, an extranet, or the Internet. The RU 102 or power distribution module 130 may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The controller 150 may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer.

The exemplary computer system 400 in this embodiment includes a processing device or processor 402, a main memory 414 (e.g., read-only memory (ROM), flash memory, dynamic random access memory (DRAM) such as synchronous DRAM (SDRAM), etc.), and a static memory 406 (e.g., flash memory, static random access memory (SRAM), etc.), which may communicate with each other via the data bus 408. Alternatively, the processing device 402 may be connected to the main memory 414 and/or static memory 406 directly or via some other connectivity means. The processing device 402 may be a controller, and the main memory 414 or static memory 406 may be any type of memory.

The processing device 402 represents one or more general-purpose processing devices such as a microprocessor, central processing unit, or the like. More particularly, the processing device 402 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 402 is configured to execute processing logic in instructions 404 for performing the operations and steps discussed herein.

The computer system 400 may further include a network interface device 410. The computer system 400 also may or may not include an input 412 to receive input and selections to be communicated to the computer system 400 when executing instructions. The computer system 400 also may or may not include an output 422, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 400 may or may not include a data storage device that includes instructions 416 stored in a computer-readable medium 418. The instructions 424 may also reside, completely or at least partially, within the main memory 414 and/or within the processing device 402 during execution thereof by the computer system 400, the main memory 414 and the processing device 402 also constituting computer-readable medium 418. The instructions 416, 424 may further be transmitted or received over a network 420 via the network interface device 410.

Many modifications and other embodiments of the embodiments set forth herein will come to mind to one skilled in the art to which the embodiments pertain having the benefit of the teachings presented in the foregoing descriptions and the associated drawings. For example, the distributed antenna systems could include any type or number of communications mediums, including but not limited to electrical conductors, optical fiber, and air (i.e., wireless transmission). The distributed antenna systems may distribute any type of communications signals, including but not limited to RF communications signals and digital data communications signals, examples of which are described in previously incorporated U.S. patent application Ser. No. 12/892,424.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A remote unit for use in a distributed communication system, comprising:
    at least one antenna configured to transmit radio frequency signals into a coverage area;
    a power input configured to receive a power signal from a power distribution module through a power medium;
    a power over Ethernet integrated circuit (POE IC) configured to measure voltage and current from the power input; and
    a control system configured to:
        open a services switch between the power input and a real load;
        instruct the POE IC to close a first switch coupling a first load resistance to the power input;
        instruct the POE IC to measure a first voltage and a first current associated with the first load resistance;
        instruct the POE IC to open the first switch and close a second switch coupling a second load resistance to the power input;
        instruct the POE IC to measure a second voltage and a second current associated with the second load resistance; and
        calculate an available power for the remote unit.

2. The remote unit of claim 1, further comprising the services switch, the first switch, and the second switch.

3. The remote unit of claim 1, wherein the POE IC comprises a current sensor.

4. The remote unit of claim 1, wherein the POE IC comprises a voltage sensor.

5. The remote unit of claim 1, wherein the remote unit is configured to receive communication signals from a fiber infrastructure.

6. The remote unit of claim 1, wherein the control system is configured to generate an alert if the available power is insufficient for all services at the remote unit.

7. The remote unit of claim 1, wherein the control system is further configured to shut off a service if the available power is insufficient for all services.

8. The remote unit of claim 1, wherein the control system is further configured to reduce transmission power for one or more services if the available power is insufficient for all services.

9. The remote unit of claim 1, wherein:
    the POE IC comprises at least one of a current sensor and a voltage sensor;
    the control system is configured to reduce transmission power for one or more services if the available power is insufficient for all services; and
    the remote unit comprises a plurality of service modules configured to provide the services at the remote unit, the plurality of service modules comprising service modules selected from the group consisting of: cellular service, radio frequency communications, WiFi, Ethernet, and location based services.

10. The remote unit of claim 1, further comprising a plurality of service modules configured to provide services at the remote unit.

11. The remote unit of claim 10, wherein the plurality of service modules comprises service modules selected from the group consisting of: cellular service, radio frequency communications, WiFi, Ethernet, and location based services.

12. The remote unit of claim 1, wherein the first load resistance comprises approximately 680Ω and the second load resistance comprises approximately 4.7 kΩ.

13. A method of managing power in a remote unit of a distributed communication system, the method comprising:
    opening a services switch associated with a real load;
    while a first switch associated with a first resistance is closed, measuring a first voltage and a first current associated with the first resistance;
    while a second switch associated with a second resistance is closed, measuring a second voltage and a second current associated with the second resistance; and
    calculating an available power for the remote unit based on the first current, the first voltage, the second current, and the second voltage.

14. The method of claim 13, further comprising closing the first switch after opening the services switch.

15. The method of claim 13, further comprising opening the first switch after measuring the first voltage and the first current.

16. The method of claim 13, further comprising closing the second switch after opening the services switch.

17. The method of claim 13, further comprising opening the second switch after measuring the second voltage and the second current.

18. The method of claim 17, further comprising closing the services switch after opening the second switch.

19. The method of claim 13, wherein measuring comprises measuring with sensors within a power over Ethernet integrated circuit (POE IC).

20. A distributed communication system, comprising a plurality of remote units, each remote unit comprising:
    at least one antenna configured to transmit radio frequency signals into a coverage area;
    a power input configured to receive a power signal from a power distribution module through a power medium;
    a power over Ethernet integrated circuit (POE IC) configured to measure voltage and current from the power input; and
    a control system configured to:
        open a services switch between the power input and a real load;
        instruct the POE IC to close a first switch coupling a first load resistance to the power input;
        instruct the POE IC to measure a first voltage and a first current associated with the first load resistance;
        instruct the POE IC to open the first switch and close a second switch coupling a second load resistance to the power input;

instruct the POE IC to measure a second voltage and a second current associated with the second load resistance; and calculate an available power for the remote unit.

* * * * *

UNITED STATES PATENT AND TRADEMARK OFFICE
CERTIFICATE OF CORRECTION

PATENT NO. : 10,992,484 B2
APPLICATION NO. : 15/049621
DATED : April 27, 2021
INVENTOR(S) : Ami Hazani et al.

Page 1 of 1

It is certified that error appears in the above-identified patent and that said Letters Patent is hereby corrected as shown below:

On the Title Page

On page 6, in Column 2, item (56), Other Publications, Line 24, delete "the the" and insert -- the --, therefor.

In the Claims

In Column 16, Line 20, Claim 12, delete "680Ω" and insert -- 680 Ω --, therefor.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*